(12) United States Patent
Feekes et al.

(10) Patent No.: US 9,734,079 B2
(45) Date of Patent: Aug. 15, 2017

(54) HYBRID EXCLUSIVE MULTI-LEVEL MEMORY ARCHITECTURE WITH MEMORY MANAGEMENT

(71) Applicant: Intel Corporation, Santa Clara, CA (US)

(72) Inventors: Dannie G. Feekes, Newmarket-on-Fergus (IE); Shlomo Raikin, Ofer (IL); Blaise Fanning, Folsom, CA (US); Joydeep Ray, Folsom, CA (US); Julius Mandelblat, Haifa (IL); Ariel Berkovits, Yuvalim (IL); Eran Shifer, Tel Aviv (IL); Zvika Greenfield, Kfar Sava (IL); Evgeny Bolotin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 13/931,701

(22) Filed: Jun. 28, 2013

(65) Prior Publication Data
US 2015/0006805 A1  Jan. 1, 2015

(51) Int. Cl.
*G06F 12/00* (2006.01)
*G06F 12/0893* (2016.01)
(Continued)

(52) U.S. Cl.
CPC ............ *G06F 12/0893* (2013.01); *G06F 1/32* (2013.01); *G06F 12/063* (2013.01); *G06F 12/08* (2013.01); *G06F 12/0866* (2013.01); *G06F 2212/205* (2013.01); *G06F 2212/206* (2013.01); *G06F 2212/281* (2013.01); *G06F 2212/604* (2013.01); *G06F 2212/608* (2013.01)

(58) Field of Classification Search
None
See application file for complete search history.

(56) References Cited

U.S. PATENT DOCUMENTS 6,256,710 B1 * 7/2001 Yazdy ................ G06F 12/0888
                                                      711/133
6,266,753 B1 * 7/2001 Hicok ................ G06F 12/1081
                                                      345/555

(Continued)

OTHER PUBLICATIONS

Zahran Mohamed, Non-Inclusion Property in Multi-level Caches Revisited, 2007, IJCA, vol. 14, No. 2.*

*Primary Examiner* — Reginald Bragdon
*Assistant Examiner* — Michael Westbrook
(74) *Attorney, Agent, or Firm* — Lowenstein Sandler LLP

(57) ABSTRACT

Hybrid multi-level memory architecture technologies are described. A System on Chip (SOC) includes multiple functional units and a multi-level memory controller (MLMC) coupled to the functional units. The MLMC is coupled to a hybrid multi-level memory architecture including a first-level dynamic random access memory (DRAM) (near memory) that is located on-package of the SOC and a second-level DRAM (far memory) that is located off-package of the SOC. The MLMC presents the first-level DRAM and the second-level DRAM as a contiguous addressable memory space and provides the first-level DRAM to software as additional memory capacity to a memory capacity of the second-level DRAM. The first-level DRAM does not store a copy of contents of the second-level DRAM.

27 Claims, 12 Drawing Sheets

(51) Int. Cl.
*G06F 12/08* (2016.01)
*G06F 12/0866* (2016.01)
*G06F 12/06* (2006.01)
*G06F 1/32* (2006.01)

(56) References Cited

U.S. PATENT DOCUMENTS

| | | | | |
|---|---|---|---|---|
| 2004/0003022 | A1* | 1/2004 | Garrison | G06F 9/5066 718/105 |
| 2004/0199728 | A1* | 10/2004 | Walker | G06F 12/0862 711/138 |
| 2006/0168390 | A1* | 7/2006 | Speier | G06F 12/0802 711/5 |
| 2007/0260827 | A1* | 11/2007 | Zimmer | G06F 12/0638 711/154 |
| 2008/0016297 | A1* | 1/2008 | Bartley | G06F 12/08 711/159 |
| 2011/0060879 | A1* | 3/2011 | Rogers | G06F 3/14 711/119 |
| 2012/0221785 | A1* | 8/2012 | Chung | G11O 5/02 711/105 |
| 2013/0138840 | A1* | 5/2013 | Kegel | G06F 13/28 710/22 |
| 2014/0040576 | A1* | 2/2014 | Cordero | G06F 11/2221 711/162 |

* cited by examiner

HYBRID EXCLUSIVE MULTI-LEVEL MEMORY ARCHITECTURE WITH MEMORY MANAGEMENT

Embodiments described herein generally relate to processing devices and, more specifically, relate to hybrid, multi-level memory architectures and operating the same.

BACKGROUND

In computing, memory refers to the physical devices used to store programs (e.g., sequences of instructions) or data (e.g. program state information) on a temporary or permanent basis for use in a computer or other digital electronic devices. The terms "memory" "main memory" or "primary memory" can be associated with addressable semiconductor memory, i.e. integrated circuits consisting of silicon-based transistors, used for example as primary memory in computers. There are two main types of semiconductor memory: volatile and non-volatile. Examples of non-volatile memory are flash memory, ROM, PROM, EPROM, or EEPROM. Examples of volatile memory are RAM or dynamic RAM (DRAM) for primary memory and static RAM (SRAM) for cache memory.

Volatile memory is computer memory that requires power to maintain the stored information. Most modern semiconductor volatile memory is either SRAM or DRAM. SRAM retains its contents as long as the power is connected and is easy to interface to but uses six transistors per bit. DRAM needs regular refresh cycles to prevent its contents being lost. However, DRAM uses only one transistor and a capacitor per bit, allowing it to reach much higher densities and, with more bits on a memory chip, be much cheaper per bit. In some implementations SRAM may be used for cache memories and DRAM is used for system memory. Current and future DRAM technologies offer a wide range of attributes with distinct power, performance and price tradeoffs. For example, some DRAM types are optimized for lower active power but may be expensive, while other DRAM technologies may offer higher active power but may be cheaper.

DESCRIPTION OF EMBODIMENTS

Figure 1:
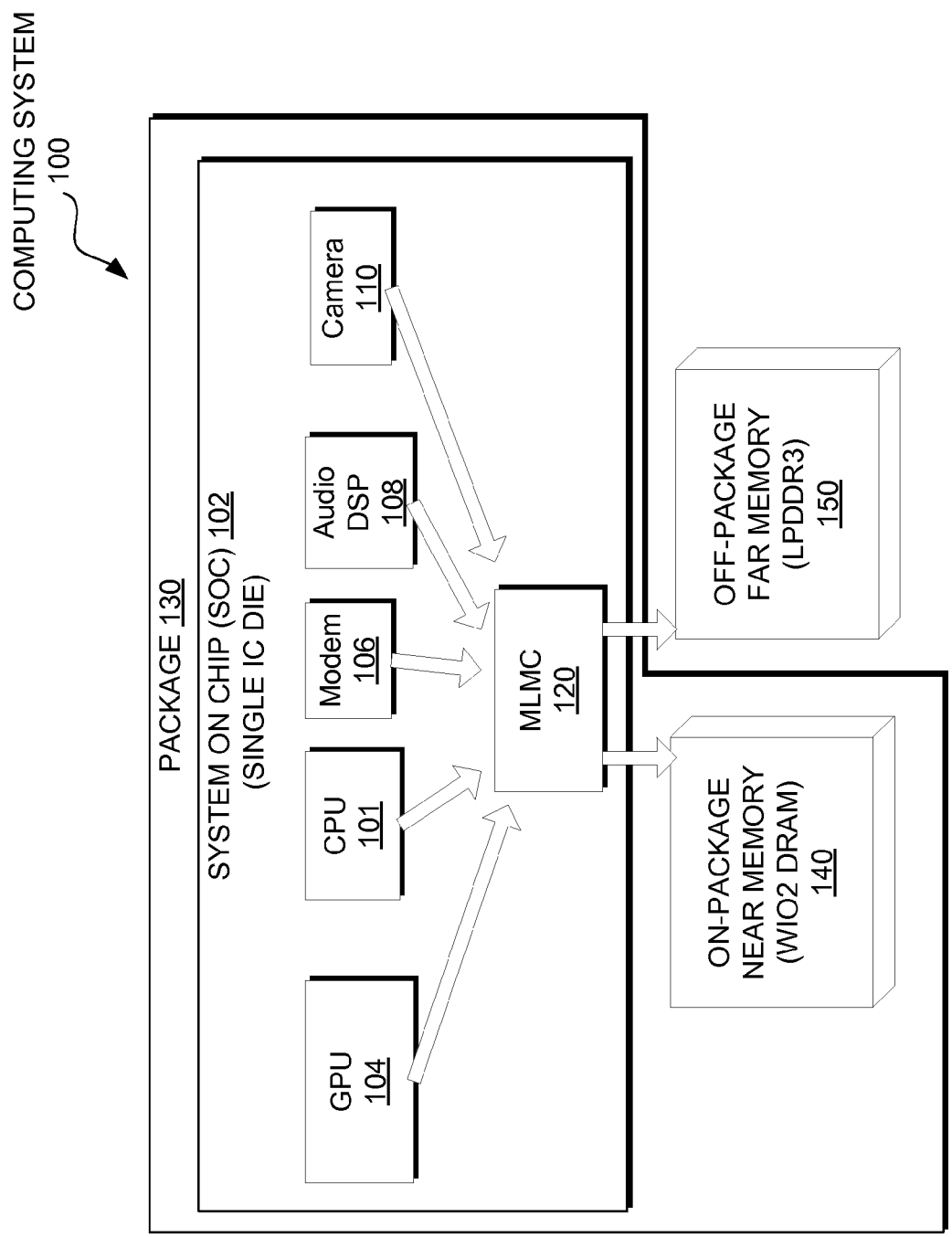
FIG. 1 is a block diagram illustrating a computing system that implements a multi-level memory controller (MLMC) for a hybrid multi-level memory (MLM) architecture according to one embodiment.

Embodiments of the disclosure provide hybrid multi-level memory architectures managed by one or more multi-level memory controllers. In one embodiment, a System on Chip (SOC) includes multiple functional hardware units and a multi-level memory controller (MLMC) coupled to the multiple functional hardware units and a hybrid multi-level memory architecture comprising a first-level DRAM (also referred to herein as near memory) that is located on-package of the SOC and a second-level DRAM (also referred to herein as far memory) that is located off-package of the SOC. The MLMC presents the first-level DRAM and the second-level DRAM as a contiguous addressable memory space and provides the first-level DRAM to software as additional memory capacity to a memory capacity of the second-level DRAM. The first-level DRAM does not store a copy of contents of the second-level DRAM.

Current DRAM memory technologies deliver a wide range of attributes with distinct power, performance and price tradeoffs. Some DRAM types can be optimized for lower active power but are expensive to manufacture and include in the SOC package, while other DRAM technologies can have higher active power but are cheaper to manufacture and include in the system. The embodiments described herein are directed to a hybrid multi-level memory (MLM) architecture where two or more different memory types are used hierarchically. The term 2LM refers to two-level memory architecture, the term 2LM-DDR refers to a two-level memory architecture using double data rate (DDR) memory technologies, and the term MLM refers to two or more level memory architecture. In one embodiment, the hybrid multi-level memory architecture that contains a smaller, faster, more expensive, lower power memory (e.g., wide input-output (I/O) two (WIO2)) coupled with a larger, slower, higher power less expensive memory (e.g., low-power double data rate three (LPDDR3)) to improve memory power-performance of a system, while keeping the cost close to a system with LPDDR3-only memory. In traditional caching architectures, the main memory is considered "back-up" memory that is inclusive of all the data residing in the cache hierarchy. This works well when the cache sizes are relatively small compared to main memory. For example, on-die SRAM caches may be few megabytes (MBs) in size and main memory may be several gigabytes (GBs). In this approach, the faster and lower power WIO2 memory may be used like a cache to capture the working set while the rest of the data is in slower and cheaper LPDDR3. However, unlike traditional caching, the far memory 150 does not store copies of the contents of the near memory 140 as described herein. The embodiments of the hybrid MLM architectures may use a sub-system interconnect architecture to utilize such hybrid memory system more effectively than previous solutions.

In traditional caching architecture, the "back-up" memory or main memory is inclusive of all the data residing in the cache hierarchy. This works well when the cache sizes are relatively small compared to main memory (e.g. on-die SRAM caches which are few MBs in size vs. main memory which is several GBs). But, when caching is extended to hybrid memory stack, the traditional caching approach leads to large wasted memory capacity in the system, since the ratio of the cache size (e.g. WIO2 memory) vs. main memory (e.g., LPDDR3) is much larger. Consider a hybrid memory system with 1 GB or WIO2 and 4 GB of LPDDR3 memory. With traditional caching, the total software visible memory capacity is 4 GB, whereas the OEM or system builder pays for a total of 5 GB of memory. This is because the content of the WIO2 memory is fully included in the LPDDR3 memory, and cannot be "advertised" as an additional memory capacity available to software. In this disclosure, memory management mechanisms (e.g., MLMC 120) mange the hybrid MLM architecture so that the content of the near memory (acting like a cache) is not included in the main memory of the far memory. So, to build an equivalent system with 4 GB of total software-visible memory, the system builder needs to pay for 1 GB of WIO2 memory and only 3 GB of LPDDR3 memory, thus saving the cost of 1 GB of memory, while still keeping the benefits of a large (1 GB) cache. This cost saving may be attractive to OEMs since the memory cost is a significant portion of the bill of materials, especially for low power, hand-held systems.

The embodiments described herein implement a hybrid multi-level memory architecture using near memory (e.g., WIO2) as the cache and far memory as the main memory (e.g., LPDDR3). This hybrid multi-level memory architecture may give flexibility of independently choosing the capacity and the number of channels for near and far memories. The hybrid multi-level memory architecture and may provide optimum power-performance by distributing the bandwidth through multiple multi-level memory controllers that act like multiple cache controllers. The embodiments described herein are compatible with existing software models (e.g. SVM, flat OS memory model), preserve the benefit of optimum caching (near memory) with hybrid multi-level memory architectures and also give better time to market and lower risks compared to operating system (OS) based approaches to multi-level memory management.

FIG. 1 is a block diagram illustrating a computing system 100 that implements a multi-level memory controller (MLMC) 120 for a hybrid multi-level memory (MLM) architecture according to one embodiment. The computing system 100 includes a System on Chip (SOC) 102. The SOC 102 may be include multiple functional hardware units, including, for example, one or more central processing units (CPUs) 101, one or more graphics processing units (GPUs) 104, a modem 106, an audio digital signal processor (DSP) 108, a camera processing unit 110, each of which are coupled to the MLMC 120. These functional hardware units may be processor cores, graphics cores (also referred to as graphics units), cache elements, computation elements, voltage regulator (VR) phases, input/output (I/O) interfaces, and their controllers, network controllers, fabric controllers, or any combination thereof. These functional units may also be logical processors, which may be considered the processor cores themselves or threads executing on the processor cores. A thread of execution is the smallest sequence of programmed instructions that can be managed independently. Multiple threads can exist within the same process and share resources such as memory, while different processes usually do not share these resources. The components of FIG. 1 can reside on "a common carrier substrate," such as, for example, an integrated circuit ("IC") die substrate, a multi-chip module substrate or the like. Alternatively, the computing system 100 may reside on one or more printed circuit boards, such as, for example, a mother board, a daughter board or other type of circuit card. In other implementations, the main memory and the computing system 100 can reside on the same or different carrier substrates.

The SOC 102 may be integrated on a single integrated circuit (IC) die within a package 130 that also includes on-package near memory 140. The MLMC 120 is coupled to the on-package near memory 140. The on-package near memory 140 may be one or more memory devices that are integrated in the package 130. Alternatively, the on-package near memory 140 may be one or more memory devices that are integrated on the same single IC die as the SOC 102. The MLMC 120 is a digital circuit which manages the flow of data going to and from the on-package near memory 140. The MLMC 120 also manages the flow of data going to and from off-package memory 150. The off-package memory 150 is not part of the package 130 and can be one or more memory devices that may be part of a dual in-line memory module (DIMM) as a series of memory ICs (e.g., DRAMs). These modules may be mounted on a printed circuit board that can be plugged into a socket of a motherboard upon which the package 130 is mounted. Alternatively, the off-package memory can be mounted on the same circuit boards upon which the package 130 is mounted. Alternatively, other configurations of the on-package near memory 140 and the off-package far memory 150 are possible.

Near memory 140 is the first level in the hybrid multi-level memory architecture. The near memory 140 typically is lower latency, higher peak bandwidth and lower power per bandwidth than far memory 150. In the following disclosure, WIO2 DRAM is used in various embodiments of the near memory 140, but other memory technologies with similar characteristics would also work. Thus, "WIO2" and "Near Memory" may be used interchangeably herein. Far memory 150 is the second level in the hybrid multi-level memory architecture. The far memory 150 typically is higher latency, lower peak bandwidth and higher power per bandwidth than the near memory 140. In the following disclosure, LPDDR3 DRAM is used in various embodiments of the far memory 150, but other memory technologies with similar characteristics would also work. Thus, "LPDDR3" and "Far Memory" may be used interchangeably herein. In one embodiment, the near memory 140 is a first memory type and the far memory 150 is a second memory type that is different than the first type. The first memory type may be lower power per bandwidth than the second memory type. The first memory type may be lower latency than the second memory type. The first memory type may be higher peak bandwidth than the second memory type. In one embodiment, the near memory 140, also referred to as the first-level memory, is embedded DRAM (eDRAM). In another embodiment, the near memory 140 is WIO2 DRAM as described herein. Alternatively, High Bandwidth Memory (HBM) can be used as near memory. Alternatively, other memory technologies can be used for the near memory 140. In another embodiment, the far memory 150, also referred to as the second-level memory, is at least one of low-power double data rate 3 (LPDDR3) DRAM, LPDDR4 DRAM, DDR3 DRAM, DDR3L DRAM, or DDR4 DRAM. Alternatively, other memory technologies can be used for the far memory 150.

There may be other configurations of the computing system 100, such as a Package on Package (PoP) configuration. PoP is an integrated circuit packaging method that combines vertically discrete logic and memory ball grid array (BGA) packages. Two or more packages are installed atop each other, i.e., stacked, with an interface to route signals between them. PoP configurations allow higher component density in devices, such as mobile phones, personal digital assistants (PDA), tablets, digital cameras and the like. For example, the SOC 102 can be in a first package on the bottom (side closest to motherboard) and a memory package with the near memory 140 on the top. Other configurations are stacked-die packages where multiple integrated circuit dies are stacked instead of packages as described above.

The memory subsystem of the SOC 102 includes the MLMC 120 to manage the hybrid multi-level memory architecture including near memory 140 and far memory 150. During operation, the MLMC 120 receives memory requests from functional units (e.g., CPU 101, GPU 104, modem 105, audio DSP 108, camera 110 or other devices. The MLMC 120 maps the memory request to the near memory 140 or the far memory 150 according to a memory management scheme. The memory management scheme may be based on at least one of a bandwidth, a latency, a power requirement, or any combination thereof of a requesting one of the functional units. For example, the MLMC 120 maps the memory request to one of the memory devices, near memory 140 or far memory 150, that best matches based on the bandwidth, latency, or power requirement.

As an example, the SOC 102 may have a CPU 101. The CPU 101 may have a relatively low bandwidth requirement. It also has a GPU 104, which may have high bandwidth requirements. Naturally, there is not enough near memory 140 (e.g., WIO2) to meet all the devices' needs of the SOC 102. This use of resources can be maximized so as to provide an optimal performance within a given power envelope. In the example hybrid memory design, there may be 1 GB of WIO2 DRAM as fast, low power, high bandwidth memory. The second type of memory used in this example may be a LPDDR3 DRAM. Thus, in one implementation, the MLMC 120 may manage memory requests to map most of the GPU request to the WIO2 DRAM and most of the CPU requests to the LPDDR3 DRAM when both agents are active to provide a benefit to power and performance of the computing system 100.

In another embodiment, the MLMC 120 is to operate as a cache controller that manages the first-level DRAM (near memory 140) as a hardware-managed cache. In these embodiments, the MLMC 120 may determine which of the first-level DRAM (e.g., near memory 140) or the second-level DRAM (e.g., far memory 150) the memory requests resides through a cache lookup. The hardware-managed cache does not store a copy of contents of the second-level DRAM. The MLMC 120 may receive memory request and determine which memory region (WIO2 or LPDDR3) the request resides through a cache lookup. The MLMC 120 is also responsible for determining which memory a request should ideally reside in. In one implementation, the MLMC 120 manages the WIO2 DRAM as a hardware-managed cache and the "hot" or frequently accessed pages are kept in the WIO2 and the "cold" or rarely used pages are left in the LPDDR3 memory. In another embodiment, the MLMC 120 is to map a first set of memory pages accessed by one or more of the functional units (101, 104, 106, 108, or 110) in the first-level DRAM (e.g., near memory 140) and a second set of memory pages accessed by one or more of the functional units in the second-level DRAM (e.g., far memory 150). The first set of memory pages are accessed more frequently than the second set of memory pages. However, the decision can also be based on one or more of the heuristics described herein.

In another embodiment, the MLMC 120 receives a memory request from one of the functional units and identifies a source identifier of the memory request. The MLMC 120 maps the memory request to the near memory 140 or the far memory 150 according to a memory management scheme. In this case, the memory management scheme is based at least in part on the source identifier. The MLMC 120 can be programmed so that memory requests with a given source ID are mapped to a specific memory type. For example, all Audio DSP requests could be mapped to far memory 150 (e.g., LPDDR3 DRAM). In one embodiment, programmable base address registers can be used to allocate region of memory to reside in near or far memory. Any request received by the MLMC 120 that hits within a region defined by a series of programmable configuration registers (e.g., BAR to BAR+ BAR size) can be mapped to far memory 150 or near memory 140. In another embodiment, implementation, if a certain memory region has a specific Quality of Service (QoS) requirement and should not be left to hardware-managed dynamic caching, then a BIOS of the computing system 100 can optionally "pin" the memory region to a specific memory type.

In another embodiment, the MLMC 120 receives a memory request from one of the functional units and the memory request corresponds to at least one of a dedicated load instruction or a dedicated store instruction that identifies one of the near memory 140 or the far memory 150. The MLMC 120 maps the memory request to the near memory 140 or the far memory 150 according to the one of the near memory 140 or the far memory 150 identified in the at least one of the dedicated load instruction or the dedicated store instruction. One of the functional units of the SOC 102 may provide performance stall information to the MLMC 120 as to which request addresses generated performance stalls so that they can be re-mapped to a lower latency memory. For example, an integer pipeline of the CPU 101 may be stalled due to an address-generation interdependency for a read to a specific address (e.g., DEAD_BEEF). The integer pipeline can notify the MLMC 120 to map the specific address (e.g., DEAD_BEEF) to the memory device with the lowest latency.

In another embodiment, the MLMC 120 receives performance stall information of a previous memory request to a logical address that is mapped to a first physical address in the far memory 150. The MLMC 120 can re-map the logical address to a second physical address in the near memory 140 in response to the performance stall information.

The system-addressable memory blocks of the contiguous addressable memory space resides in only one of the near memory 140 or the far memory 150 at any given time. The hybrid multi-level memory architecture may be a pointer-based, non-inclusive memory architecture. The MLMC 120 tracks where a given system-addressable memory block is currently residing through a lookup table, much like a cache lookup table. The lookup table can be store in a dedicated region of near memory 140. This dedicated region may not be advertised to the software or can be protected in other ways.

As described herein, the MLMC 120 can decide which memory request should ideally reside in Near Memory and can move data from one memory to the other. In one embodiment, the MLMC 120 identifies a first memory page currently residing in the far memory 150 to be relocated to the near memory 140 and identifies a second memory page in the near memory 140 to be swapped with the first memory page. The MLMC 120 swaps the second memory page with the first memory page. The second memory page is written to the second-level DRAM because a copy is not already stored in the far memory 150, as done in traditional caching. The first and second memory pages can be written to temporary buffers to write the data to the other one of the memories.

In another embodiment, the wherein the contiguous addressable memory space is divided into sets and ways, wherein for each set, a first portion of the ways reside in the near memory 140 and a second portion of the ways reside in the far memory 150, wherein a first number of ways in the first portion over a second number of ways in the second portion is proportional to a ratio of the additional memory capacity of the near memory 140 to the memory capacitive of the far memory 150.

Operating the near memory 140 like a cache in a hybrid multi-level memory architecture, a power benefit may be achieved as compared to a single level memory architecture. For example, from memory footprint analysis conducted for the phone and tablet space, a 1 GB cache may yield an average miss rate of less than 2%; thus, at least a 30% memory power improvement may be achievable with this hybrid multi-level memory architecture.

The computing system 100 may include one or more functional units that execute instructions that cause the computing system to perform any one or more of the methodologies discussed herein. The computing system 100 may be connected (e.g., networked) to other machines in a LAN, an intranet, an extranet, or the Internet. The computing system 100 may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for the computing system 100, the term "machine" shall also be taken to include any collection of machines that individually or jointly execute a set (or multiple sets) of instructions to perform any one or more of the methodologies discussed herein.

In addition to the illustrated components, the computing system 100 may include one or more processors, one or more main memory devices, one or more static memory devices and one or more data storage device, which communicate with each other via a bus. The processors may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), network processor, or the like. In one embodiment, processor may include one or processing cores. The processor is configured to execute the processing logic for performing the operations discussed herein. In one embodiment, processor is the same as SOC 102 of FIG. 1 that implements one or more MLMCs 120. Alternatively, the computing system 100 can include other components as described herein, as well as network interface device, video display units, alphanumeric input devices, cursor control devices, a signal generation device, or other peripheral devices.

In another embodiment, the computing system 100 may include a chipset (not illustrated), which refers to a group of integrated circuits, or chips, that are designed to work with the SOC 102 and controls communications between the SOC 102 and external devices. For example, the chipset may be a set of chips on a motherboard that links the CPU 101 to very high-speed devices, such as far memory 150 and graphic controllers, as well as linking the CPU 101 to lower-speed peripheral buses of peripherals, such as USB, PCI or ISA buses.

The data storage device (not illustrated) may include a computer-readable storage medium on which is stored software embodying any one or more of the methodologies of functions described herein. The software may also reside, completely or at least partially, within the main memory as instructions and/or within the SOC 102 as processing logic during execution thereof by the computing system 100. The computer-readable storage medium may also be used to store instructions for the operations of the MLMC 120, and/or a software library containing methods that call the above applications. Alternatively, the MLMC 120 may include firmware that executes the instructions.

Figure 2:
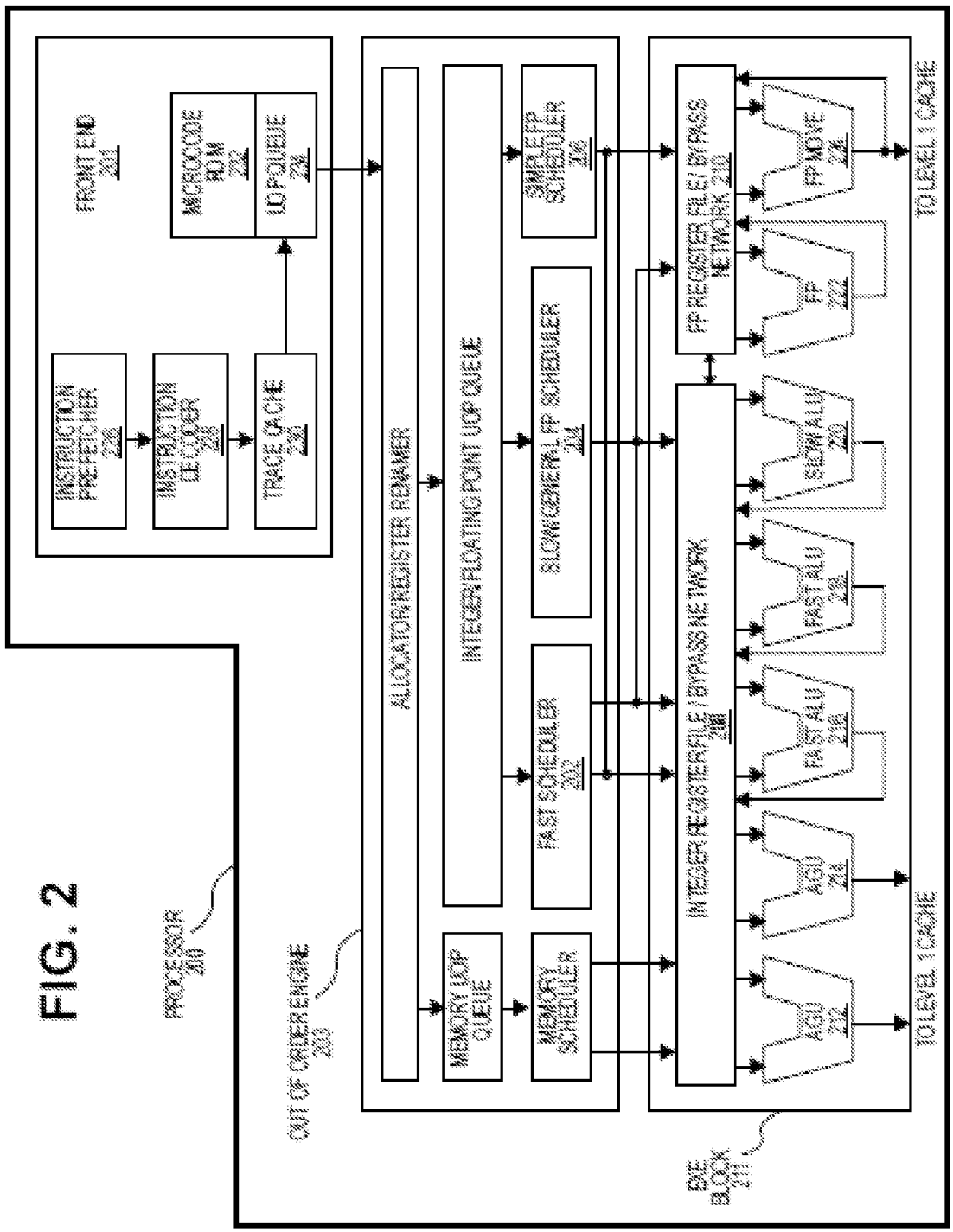
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3:
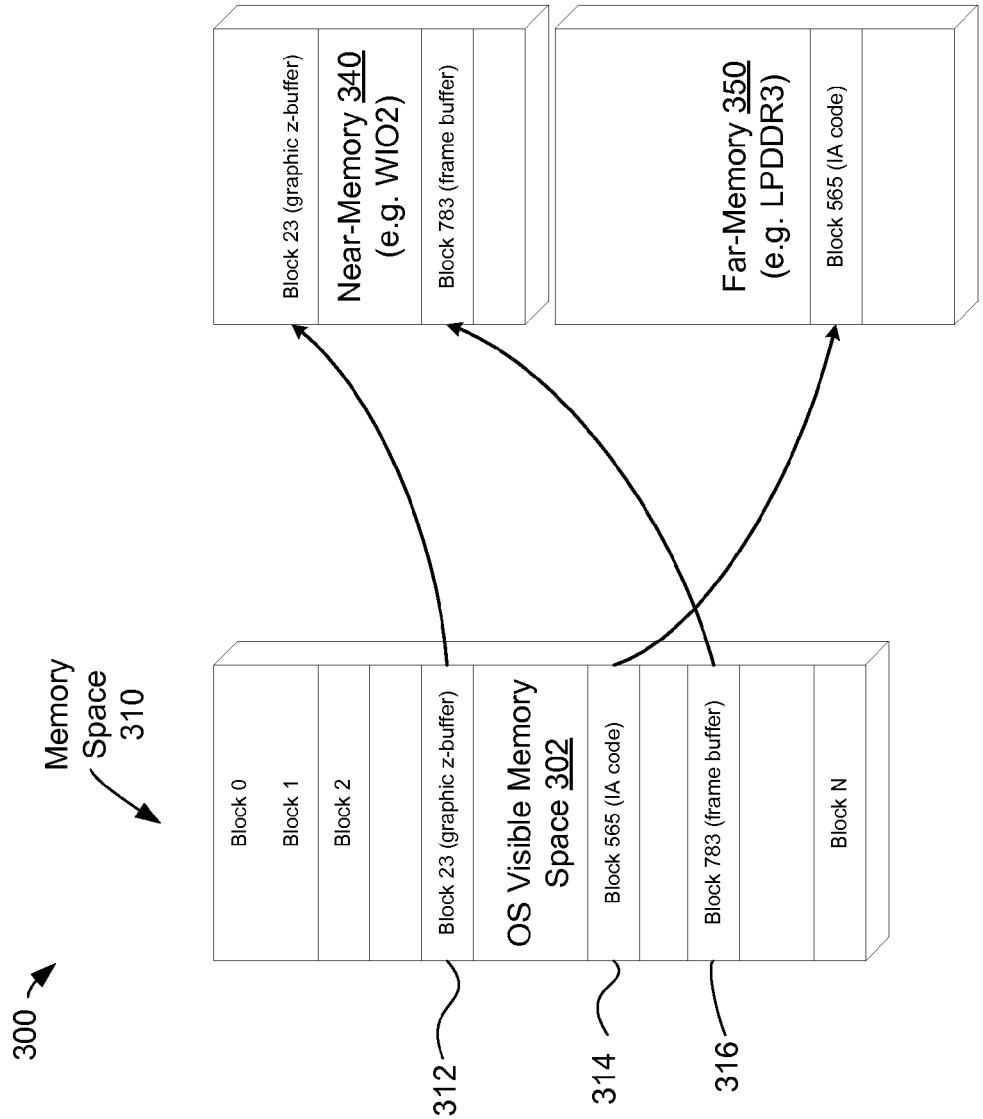
FIG. 3 illustrates mapping operating system (OS) visible memory to near memory and far memory of the hybrid MLM architecture according to one embodiment.

FIG. 3 illustrates mapping operating system (OS) visible memory to near memory and far memory of the hybrid MLM architecture according to one embodiment. As described above, the MLMC 120 presents the near memory 340 (first-level DRAM) and the far memory 350 (second-level DRAM) as a contiguous addressable memory space 310 to software. As shown in FIG. 3, the near memory 340 does not store a copy of contents of the far memory 340 and is presented to software as additional memory capacity to a memory capacity of the far memory 350. The memory space 310 includes multiple blocks, Block 0 to Block N. Each of the blocks in the memory space 310 is mapped to one of the near memory 340 and the far memory 350. To the OS and firmware, the memory space 310 appears as one contiguous addressable memory but behind the scenes, the MLMC maps the memory requests between the near memory 340 and far memory 350 according to one of the multi-level memory management schemes described herein. It should be noted that at any given time, there is only one location where a given system-addressable memory block resides, either in the near memory 340 or far memory 350, but not both. This is unlike traditional caching architecture where the final level in the hierarchy (usually the "main" memory) has a fixed space allocated for all the data blocks included in the higher level caches. Inclusive memory architectures, like in traditional caching, can waste a lot memory space, especially when systems have larger caches like 1 GB or more. The hybrid MLM architecture, illustrated in FIG. 3, may be a pointer-based, non-inclusive memory hierarchy to optimize the total memory used in the system. This architecture may reduce costs of memory.

During operation, the MLMC 120 may keep track of where a given system-addressable memory block is currently residing through a lookup table (which may be akin to a tag array of a traditional cache) and associated cache-controller hardware. When the MLMC 120 needs to bring a new page currently residing in far memory 350 (e.g., LPDDR3) into the near memory 340 (e.g., WIO2), the MLMC 120 finds a victim page in near memory 340 and swaps this victim page with the new page in far memory 350. This is unlike traditional caching where a clean (unmodified) victim page does not need to be written back to main memory since the main memory always have a copy.

In one embodiment, the total system memory of the memory space 310 is divided in to "sets" and "ways", similar to a traditional cache. For each set, some of the ways reside in the Near Memory 340 (WIO2) and the rest in the Far Memory 350 (LPDDR3). The number of ways in the Near Memory 340 over the number of ways in Far Memory 350 is proportional to the ratio of the Near to Far Memory sizes. For example, in one embodiment, the computing system 100 has 1 GB of WIO2 and 2 GB of LPDDR3. The cache block size is 4 KB, and the system memory has 48 ways. In this case, out of the 48 ways for a set, 16 ways reside in the WIO2 memory and other 32 ways reside in the LPDDR3 memory, because 16/32=1 GB/2 GB.

In another embodiment, a portion of the near memory 340 is reserved for a lookup table for the MLMC 120. The lookup table includes N entries, where N is equal to a number of sets in the contiguous addressable memory space. Each of the N entries includes a set of M pointers, where M is equal to the number of ways in the sets. The set of M pointers store way numbers of where memory blocks that map to a particular set and set-offset currently resides. In a further embodiment, a second MLMC is coupled to the functional units and the other MLMC 120. A bandwidth to the near memory 340 is distributed between the MLMC 120 and the second MLMC. Additional details regarding the use of multiple MLMCs are described below with respect to FIG. 6.

In the depicted example, the memory space 310 includes "Block 23" 312 corresponding to a graphic z-buffer of a GPU, "Block 565" 314 corresponding to IA code, and "Block 783" corresponding to a frame buffer. MLMC 120 maps Block 23 312 and Block 783 316 to near memory 340 and maps Block 565 314 to far memory 350. Alternatively, the blocks of the memory space 310 may correspond to other memory requests by the functional units and can be mapped to either near memory 340 or far memory 350.

Figure 4:
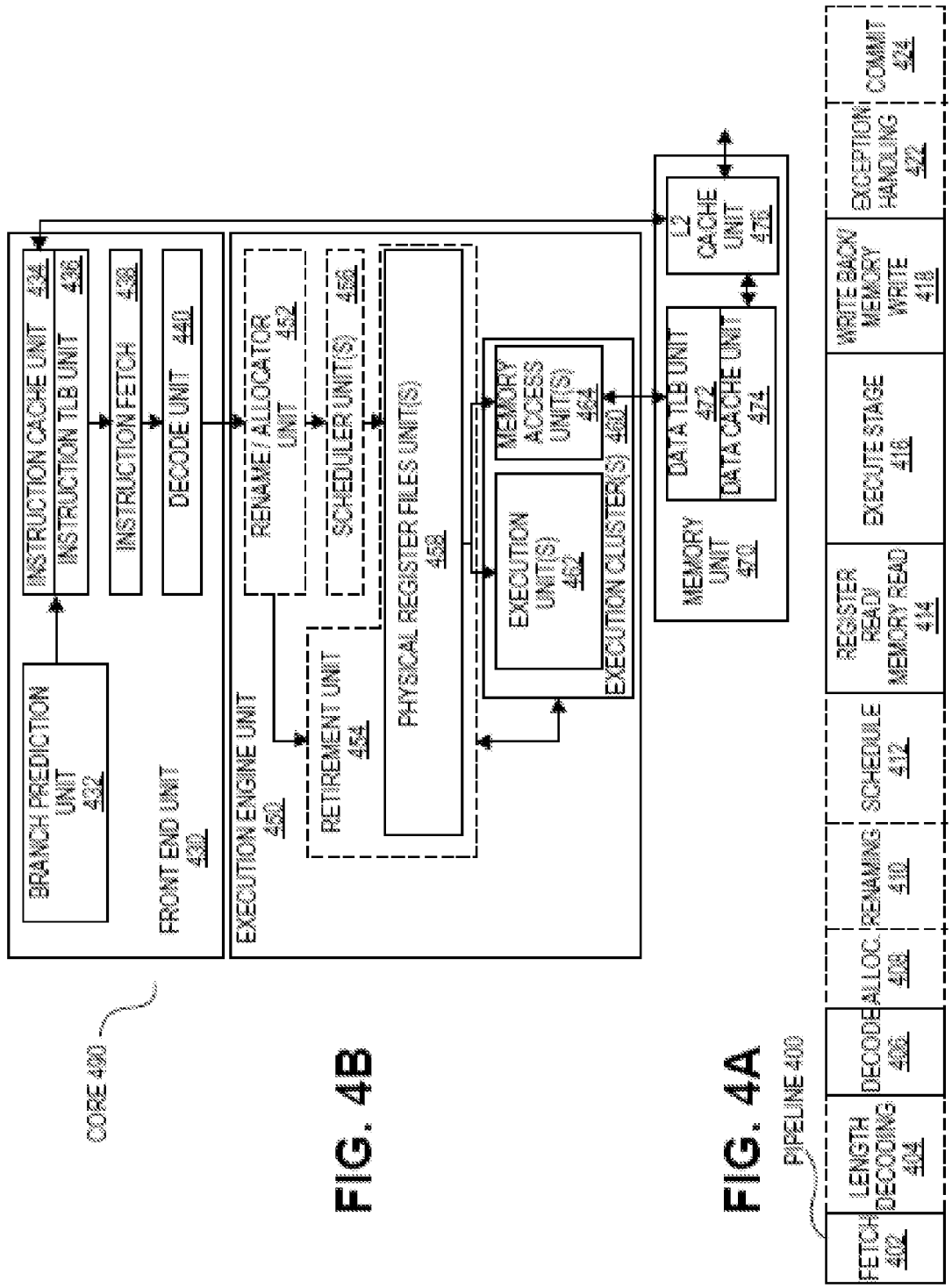
FIG. 4A illustrates elements of a processor micro-architecture according to one embodiment.
FIG. 4B illustrates elements of a processor micro-architecture according to one embodiment.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
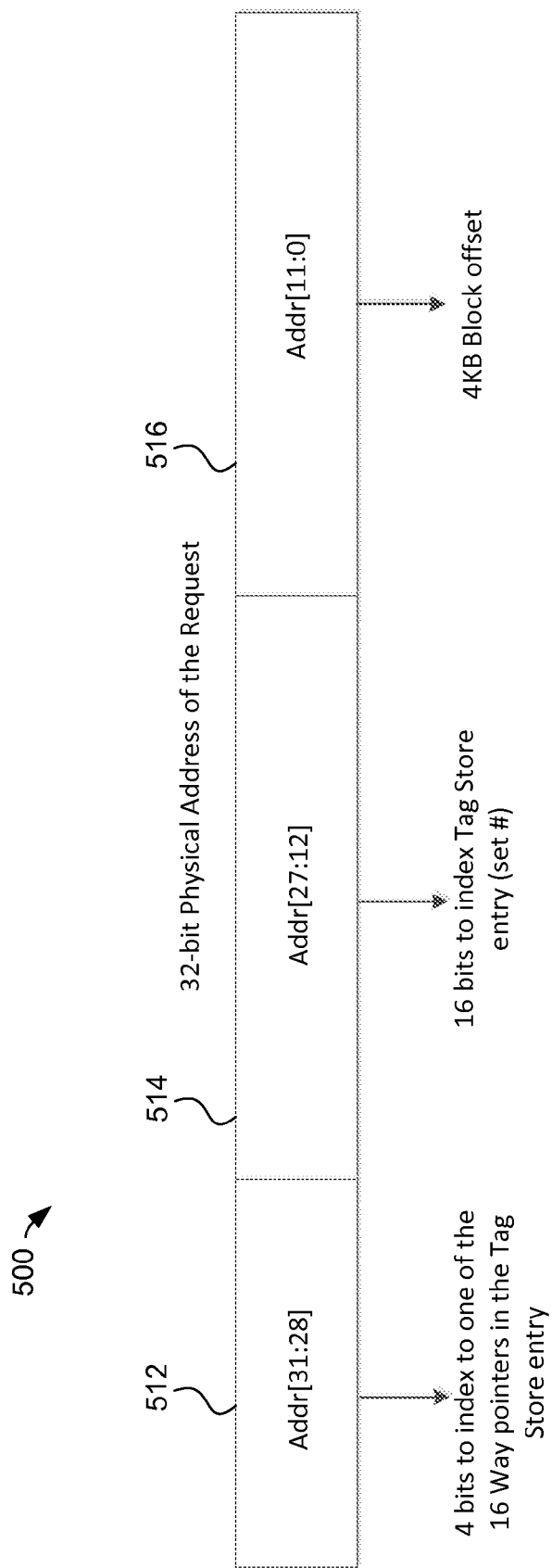
FIG. 5 illustrates a physical address of a memory request for decoding to a lookup table entry and offset according to one embodiment.

FIG. 5 illustrates a physical address 500 of a memory request for decoding to a lookup table entry and offset according to one embodiment. The physical address 500 includes a first portion 512, a second portion 514 and a third portion 516. The first portion 512 includes 4 bits to index to one of the 16 way pointers in a lookup table entry (also referred to as tag store entry). The second portion includes 16 bits to index the lookup table entry (also referred to as the set number). The third portion includes 12 bits that include the 4 KB block offset. Of course, other numbers of bits may be used in the physical address.

As described herein, a small portion of the near memory (e.g., WIO2) may be reserved to keep the lookup table (also referred to as the "Tag Store"). The lookup table includes N entries where N equals to the number of sets in the memory subsystem. Each entry has a set of M pointers, where M equals to the number of ways. The pointers store the way numbers of where the memory blocks that map to this particular set and set-offset currently resides. The 32-bit physical address 500 of the request can be decoded to determine the lookup table entry and offset. One of the ways (e.g., way-0) in the near memory (e.g., WIO2) may be used to keep the lookup table (e.g., Tag Store) can be reserved with other memory regions used by BIOS at boot-time. This way is not visible to the OS and is not used as part of the near memory. The other 15 ways can be used as the available near memory.

Hence, in the example above, in each set there are 15 "fast" ways that reside in the near memory (WIO2 cache) and 32 "slow" ways that reside in the far memory (LPDDR3). The lookup table keeps the pointer for each block (e.g., 4 KB block) in which of the 47 possible ways the block resides. Every memory access first looks up the corresponding Tag Store pointer (entry and offset) to determine which way of the set the data is currently residing. Since the data is in one of the available ways, the lookup does not return a "miss," but merely a way number where the data is located. The way number is further decoded in to the memory type (WIO2 or LPDDR3) and memory channel, and then the request is sent to corresponding memory controller (e.g. MC for WIO2 channel 1). The memory controller may further decode the address into row/bank/column.

It should be noted that unlike traditional caches, the MLMC lookup table entry (e.g., Tag Store entry) does not have the concept of "Dirty" blocks since there is no other copy of the block in the main memory.

When the MLMC decides to bring in a memory block from the far memory (LPDDR3) into near memory (WIO2), the MLMC writes back a victim block from near memory to far memory to make space for the new block. Both the source and destination data can be written into temporary buffers during this process and snooping of the interim buffers can be done to ensure coherency. Then the corresponding lookup table entry for the set is updated to reflect the new way pointers for the data blocks.

For possible better active power and bandwidth scalability across a product stack, the bandwidth of the near memory can be distributed between multiple MLMCs. This way, higher bandwidth and capacity can be easily achieved by adding more memory channels and corresponding MLMC units for the near memory. The MLMCs can be configured to operate independently of each other. A system interconnect or interconnect fabric can be used as described below with respect to FIG. 6 to implement multiple MLMCs. The system interconnect can provide flexibility in choosing the number of Far Memory (LPDDR3) channels and their capacity independent of the number of Near Memory channels (WIO2) and their capacity. Also, different Far Memory channels can have different capacities, without compromising equal bandwidth distribution to the Near Memory channels; the near memory channels and the far memory channels may be independent. These capabilities may allow the use of the same micro-architecture in to multiple products with different needs for capacity and peak bandwidth.

Figure 6:
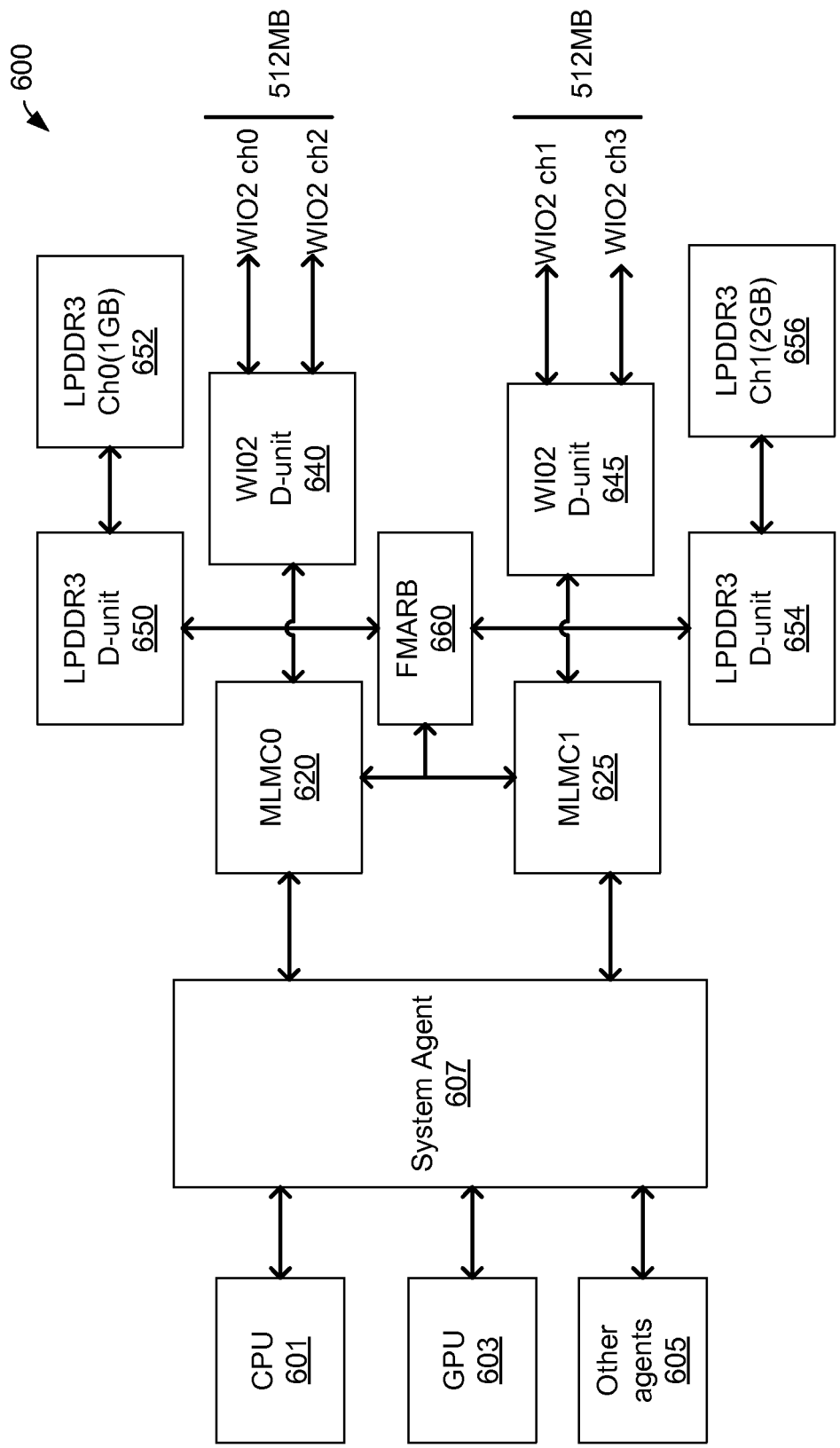
FIG. 6 is a block diagram illustrating a system interconnect for a hybrid MLM architecture according to one embodiment.

FIG. 6 is a block diagram illustrating a system interconnect 600 for a hybrid MLM architecture according to one embodiment. The system interconnect 600 includes two MLMCs 620, 625. However, additional MLMCs can be added to add additional near memory channels. The MLMCs 620, 625 can interface with a system agent 607 that interfaces with a CPU 601, a GPU 603 and other agents 605. The CPU 601, GPU 603 and other agents 605 can issue memory requests in the hybrid MLM architecture. As described above, the MLMCs 620, 625 present the far and near memories as one contiguous memory space to the software executing on these components.

In the depicted embodiment, the system interconnect fabric includes WIO2 as the near memory and LPDDR3 as the far memory. The LPDDR3 D-units 650 and 654 are the memory controllers for the LPDDR3 channels while the WIO2 D-units 640 and 645 are the memory controllers for two near memory channels each (WIO2 ch0 and ch2 for WIO2 D-unit 640 and WIO2 ch1 and ch3 for WIO2 D-unit 645). The LPDDR3 D-units 650 and 654 couple to the far memory LPDDR3 Ch0 652 and LPDDR3 Ch1 656, respectively. In one example, the LPDDR3 Ch0 652 is 1 GB and the LPDDR3 Ch1 656 is 2 GBs. In this example, the near memory WIO2 Ch0 and Ch2 are 512 MBs and the WIO2 Ch1 and CH3 are 512 MBs. Alternatively, the far and near memories may have different capacities than these exemplary capacities. Also, additional far memory devices can be added to scale the amount of far memory for the main memory. the WIO2 D-unit 640 interfaces to one or more near memory devices The FMARB unit 660 is a crossbar switch that allows multiple MLMCs to send memory requests to multiple LPDDR3 D-units. The microarchitecture shown in FIG. 6 has four total near memory WIO2 channels and two far memory LPDDR3 channels. However, the micro-architecture of FIG. 6 is scalable to support more channels if higher bandwidth and capacity is needed in the system.

In one embodiment, the system memory address is equally distributed and interleaved between all the MLMC units. The different far memory (LPDDR3) channels are allowed to have different capacity, but the total far memory capacity is always equally divided between all the MLMC units. In one embodiment, this may be achieved by implementing an address range-based router in the FMARB unit 660. As an example, each pair of WIO2 channels is 512 MB in capacity (total of 1 GB WIO2), and the first LPDDR3 channel (ch0) 652 is 1 GB in capacity, while the LPDDR3 ch1 656 is 2 GB in capacity. This gives a total system memory of 4 GB. In this case, the first LPDDR3 channel (ch0) 652 can be fully assigned to MLMC0 620, while the ¼ of LPDDR3 ch1 (i.e. 0.5 GB) 656 is also assigned to MLMC0 620. The rest (¾) of the LPDDR3 ch1 (i.e. 1.5 GB) 656 is assigned to MLMC1 625. This way, each MLMC maps 2 GB of memory (0.5 GB of WIO2 and 1.5 GB of LPDDR), interleaved at a granularity of 4 KB (the memory block size in this example). The crossbar router in FMARB unit 660 can route memory requests and responses to correct destinations based on programmed address range that is programmed by BIOS during boot time or set via fuses.

This scheme allows distributed MLMC controllers (for best power and scalability) and also optimal distribution of memory traffic between the WIO2 channels (for best hit rate and bandwidth) even if the LPDDR3 channels are asymmetric in capacity. The optimal memory traffic distribution between the MLMC (and WIO2) channels is due to equally dividing the Near and Far memory sizes between the MLMC and interleaving at the memory block size (4 GB in this example).

In one embodiment, a memory request is received at the system agent 607 from one of the CPU 601, GPU 603 or other agents 605, and the system agent 607 directs the memory request to one of the MLMC0 620 or MLMC1 625. The corresponding MLMC can perform a lookup to map the memory request to either near or far memory. If the lookup results in the memory request being mapped to near memory (which may be considered a MLMC cache Hit), the MLMC directs the memory request to the corresponding WIO2 D-unit, which can further decode the memory request to determine a WIO2 channel as described herein. If the lookup results in the memory request being mapped to far memory (which may be considered a MLMC cache Miss), the MLMC directs the memory request to the FMARB unit 660, which directs the memory request to the corresponding LPDDR3-unit, which interfaces with the corresponding LPDDR3 channel.

Figure 7:
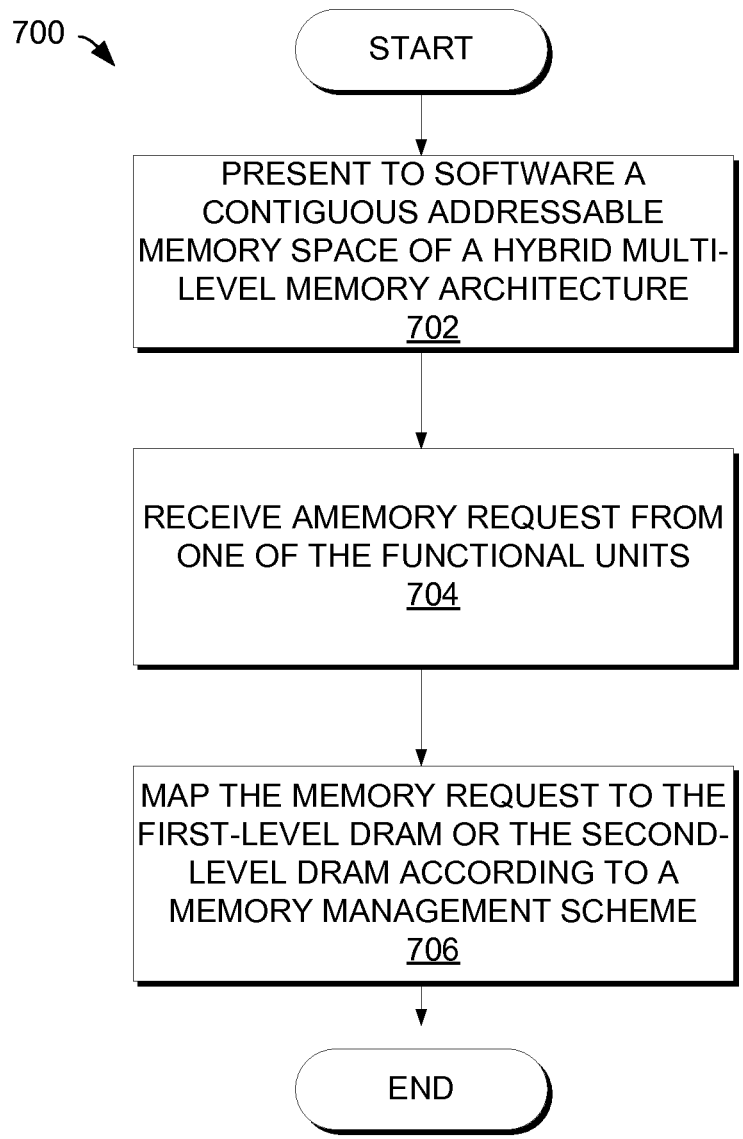
FIG. 7 is a flow diagram illustrating a method of mapping memory requests to near memory and far memory of a hybrid MLM architecture according to one embodiment.

FIG. 7 is a flow diagram illustrating a method 700 of mapping memory requests to near memory and far memory of a hybrid MLM architecture according to one embodiment. Method 700 may be performed by processing logic that may comprise hardware (e.g., circuitry, dedicated logic, programmable logic, microcode, etc.), software (such as instructions running on the MLMC), firmware or a combination thereof. In one embodiment, method 700 is performed by MLMC 120 of FIG. 1. In another embodiment, the method 700 is performed by the MLMC0 620 or MLMC1 625 of FIG. 6. Alternatively, other components of the computing system 100 or system interconnect 600 may perform some or all of the operations of the method 700.

Referring to FIG. 7, the method 700 begins by the processing logic presenting to software a contiguous addressable memory space of the hybrid multi-level memory architecture (block 702). The hybrid multi-level memory architecture includes a first-level DRAM that is located on-package and a second-level DRAM that is located off-package. The first-level DRAM does not store a copy of contents of the second-level DRAM. At block 704, the processing logic receives a memory request from one of functional units. The processing logic maps the memory request to the first-level DRAM or the second-level DRAM according to a memory management scheme, and the method 700 ends. As described herein, the memory management scheme may be based on frequency of access of memory pages, based on bandwidth, latency, power requirement or a combination thereof of the requesting functional unit as described herein. The memory management scheme may be any of the other memory management schemes as described herein or the like.

In a further embodiment, the processing logic at block 706 can manage the first-level DRAM as a hardware-managed cache. The processing logic determines which of the first-level DRAM or the second-level DRAM the memory request resides through a cache lookup. The hardware-managed cache does not store a copy of contents of the second-level DRAM.

In another embodiment, the processing logic at block 706 can map a first set of memory pages accessed by one or more of the functional units in the first-level DRAM and can map a second set of memory pages accessed by one or more of the functional units in the second-level DRAM. The first set of memory pages are accessed more frequently than the second set of memory pages.

In another embodiment, the processing logic at block 706 can identify a source identifier of the memory request. The processing logic maps the memory request to the first-level DRAM or the second-level DRAM based at least in part on the source identifier.

In another embodiment, the memory request corresponds to at least one of a dedicated load instruction or a dedicated store instruction that identifies one of the first-level DRAM or the second-level DRAM. The processing logic at block 706 can map the memory request to one of the first-level DRAM or the second-level DRAM according to the one of the first-level DRAM or the second-level DRAM identified in the at least one of the dedicated load instruction or the dedicated store instruction.

In another embodiment, the processing logic at block 706 can receive performance stall information of a previous memory request to a logical address that is mapped to a first physical address in the second-level DRAM. The processing logic can re-map the logical address to a second physical address in the first-level DRAM in response to the performance stall information.

In another embodiment, the processing logic at block 706 can identify a first memory page currently residing in the second-level DRAM to be relocated to the first-level DRAM. The processing logic also identifies a second memory page in the first-level DRAM to be swapped with the first memory page and swaps the second memory page with the first memory page.

The demand for memory bandwidth constantly increases. The demand drivers are bigger displays with higher resolutions, imaging, higher compute requirements, parallel workloads, 3D graphics and more. Some conventional solutions are increasing the signal rate and adding more memory channels that push the DDR bandwidth higher. Other conventional solutions increase the size of on-die caches that can provide the required memory bandwidth. Some conventional solutions add high bandwidth in-package memories. The DDR technologies, however, do not have high enough signal rate to satisfy the demand. Also, adding more memory channels can be very expensive. In addition, on-die caches have limited capacity and do not manage to filter enough bandwidth; that is, the required bandwidth from the DDR channels is still too high. On-package memories, such as those described herein, like FWIO, eDRAM, exhibit high hit rates and provide rather high bandwidth, but by themselves may not satisfy bandwidth intensive machines.

Described below are various embodiments of memory management schemes to address some of the shortcomings noted above, as well as provide additional benefits over conventional solutions. The description below refers to in-package memory (IPM), like FWIO, eDRAM, or the like. The IPM may also refer to the near memory or first-level memory described above. The description below also refers to out-of-package memory (OPM), like DDR4, LPDDR4 or the like. The OPM may also refer to the near memory or first-level memory described above. Also, BW(IPM) denotes a peak bandwidth the IPM can supply and BW(OPM) denotes a peak bandwidth the OPM can supply. BW(System) denotes a peak bandwidth the BW consumer (like CPU, GPU, and graphic accelerator) can use at a given time.

When IPM hit rate approaches 100% (as is the case of 1 GB FWIO), all of the memory bandwidth (BW) is being supplied by the IPM, so all available memory BW of the OPM is being wasted and not used. This leads to the situation where BW(System)~=BW(IPM). Even if IPM hit rate is not that high (as in the case of 64 MB eDRAM with +80% hit rate), the memory demand exhibits phase behavior, and tends to be bursty. During a given phase, the application either hits the cache almost 100% of the time, or misses it almost completely (this happens in a scene transition during 3D game, for example). This leads to a situation where BW(System)<BW(IPM). In one embodiment, the MLMC can be programmed to where the peak bandwidth of the system is approximately equal to the peak bandwidth of IPM plus the peak bandwidth of the OPM (BW(System)~=BW(IPM)+BW(OPM). Some real life examples show that the bandwidth can be increase as follows BW(IPM)~=2*BW(OPM), so BW(IPM)+BW(OPM)~=1.5BW(IPM). In other words, a 50% increase in total BW.

In order to use BW(OPM), the MLMC ensures that a significant part of the memory traffic is served or will be served by the OPM. In other words, the MLMC can guarantee that a significant enough part of the memory requests to IPM are misses.

Figure 8:
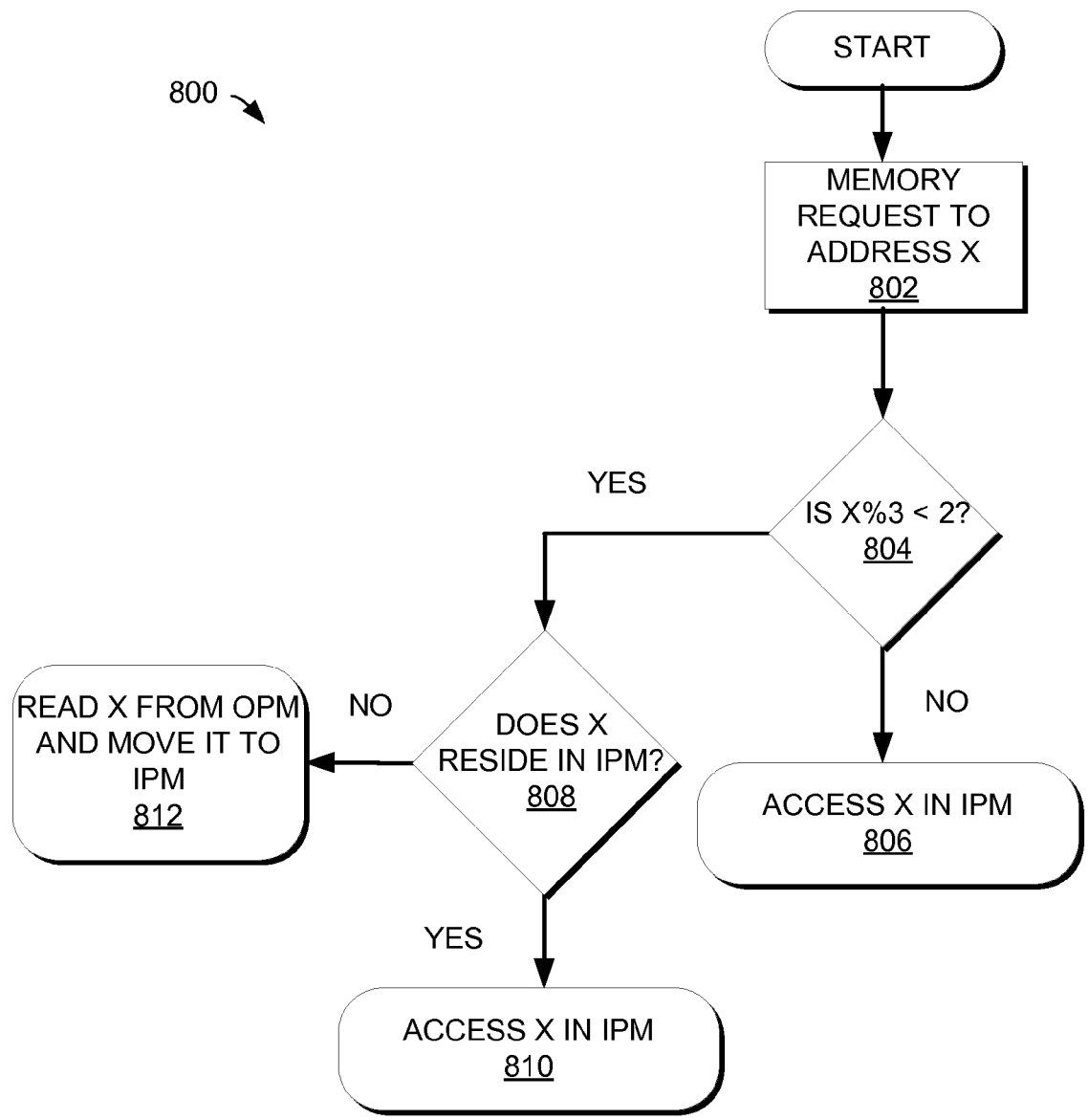
FIG. 8 is a flow diagram illustrating a method of dynamically dividing bandwidth between near memory and far memory of a hybrid MLM architecture according to one embodiment.

Conceptually one can imagine that the hit rate in IPM is forced to approach, say, 67% (in case where BW(IPM) =2*BW(OPM)). And this needs to happen in a steady state, non bursty manner. Making sure that part of the memory traffic will be served by OPM is done by not writing part of the data set to IPM in the first place. FIG. 8 illustrates one method to force some of the traffic to OPM, assuming the following BW(IPM)=2*BW(OPM).

FIG. 8 is a flow diagram illustrating a method 800 of dynamically dividing bandwidth between near memory and far memory of a hybrid MLM architecture according to one embodiment. Method 800 may be performed by processing logic that may comprise hardware (e.g., circuitry, dedicated logic, programmable logic, microcode, etc.), software (such as instructions running on the MLMC), firmware or a combination thereof. In one embodiment, method 800 is performed by MLMC 120 of FIG. 1. In another embodiment, the method 800 is performed by the MLMC0 620 or MLMC1 625 of FIG. 6. Alternatively, other components of the computing system 100 or system interconnect 600 may perform some or all of the operations of the method 800.

Referring to FIG. 8, the method 800 begins by the processing logic receiving a memory request to an address X (block 802). The processing logic uses modulo 3 with the address and determines if the result is less than two (e.g., X %3<2) (block 802). The processing logic can use module 3 to dynamically cache 67% of the data set to IPM and 33% to OPM, so 67% of memory traffic is directed to and served by IPM. If the result is not less than two, the processing logic accesses the address X in IPM (block 806). If the result is less than two, the processing logic determines if address X resides in IPM (block 808). If the address X resides in IPM, the processing logic accesses X in IPM (block 810); otherwise, the processing logic reads address X from OPM and moves it to IPM (block 812), and the method 800 ends. If the BW ratio between IPM and OPM is different, different arithmetic operation can be used like module 7, for example.

Caches in general work with sets and ways. Mechanisms can be us to guarantee that all sets have equal probability of being used. This can be done by using a modulo operation that has no common divider with the number of sets. As an example where the IPM manages blocks of 1 KB, the set bits start at bit '10. The modulo operation can be performed on a portion of the address, such as bits [32 . . . 10] (assuming 4 GB of total address space).

Due to difference in power consumption of IPM and OPM, it might be the case that IPM is preferable. In other words, as long as the application does not reach the peak BW that IPM can provide, it may preferable to use IPM only. In that case, additional logic can be added that dynamically decides whether to divide the memory requests between the IPM and OPM, or use IPM only. If such mechanism is added, relevant data that was already cached in IPM should be evicted to OPM. This can happen dynamically whenever such data is accessed. This idea is depicted in the methods of FIGS. 9 and 10.

Figure 9:
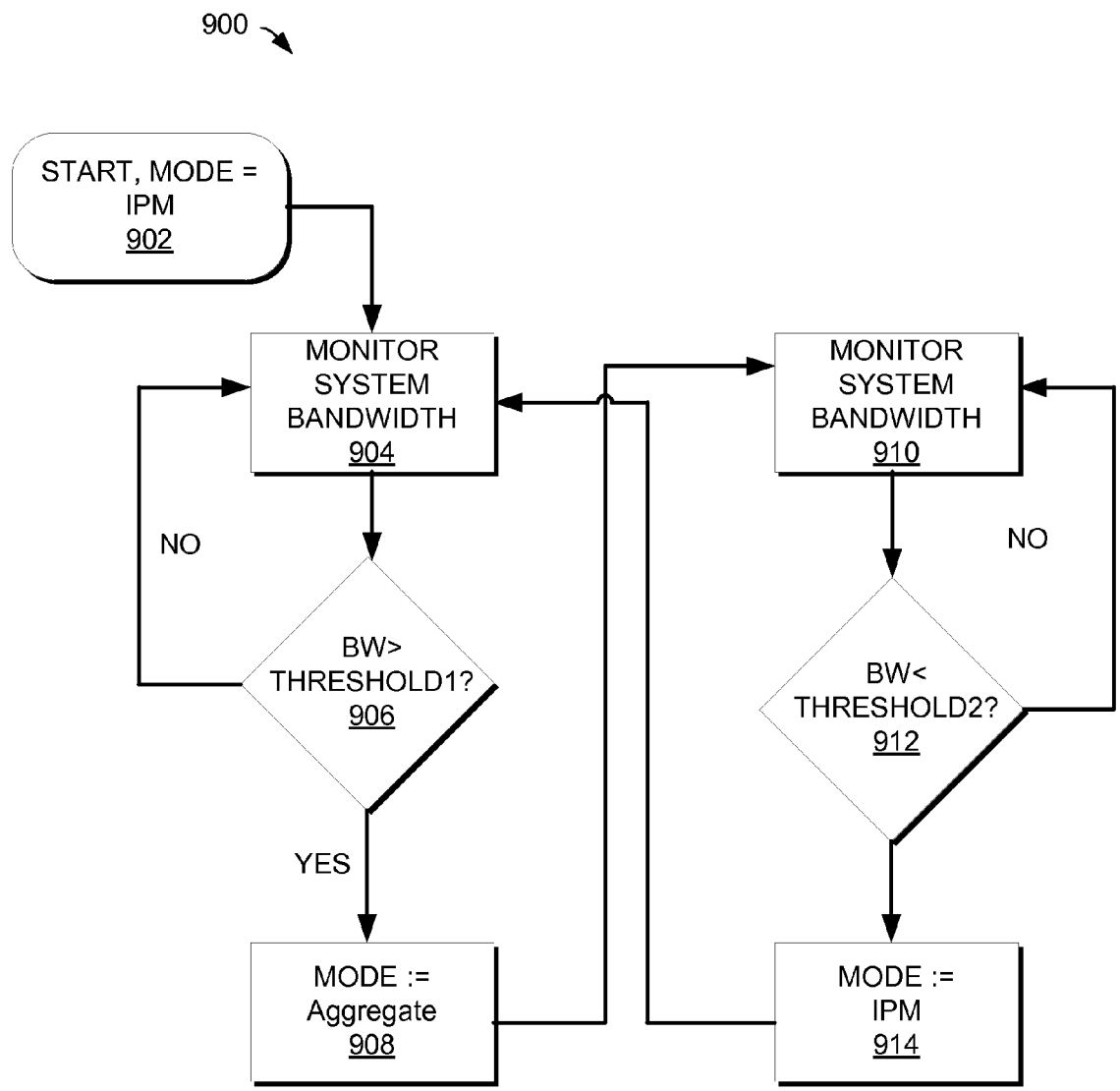
FIG. 9 is a flow diagram illustrating a method of setting a machine mode for dividing bandwidth between near memory and far memory of a hybrid MLM architecture according to one embodiment.

FIG. 9 is a flow diagram illustrating a method 900 of setting a machine mode for dividing bandwidth between near memory and far memory of a hybrid MLM architecture according to one embodiment. Method 900 may be performed by processing logic that may comprise hardware (e.g., circuitry, dedicated logic, programmable logic, microcode, etc.), software (such as instructions running on the MLMC), firmware or a combination thereof. In one embodiment, method 900 is performed by MLMC 120 of FIG. 1. In another embodiment, the method 900 is performed by the MLMC0 620 or MLMC1 625 of FIG. 6. Alternatively, other components of the computing system 100 or system interconnect 600 may perform some or all of the operations of the method 900.

Referring to FIG. 9, the method 900 begins by the processing logic starting in IPM mode (block 902). The processing logic monitors the system bandwidth (block 904) and determines if the bandwidth is greater than a first threshold (block 906). If the bandwidth is not greater than the first threshold, the processing logic continues monitoring the system bandwidth at block 904. When the bandwidth is greater than the first threshold, the processing logic enters aggregate mode (block 908). The IPM mode and aggregate modes are described below with respect to FIG. 10. While in aggregate mode, the processing logic monitors the system bandwidth (block 910) and determines if the bandwidth is less than a second threshold (block 912). If the bandwidth is no less than the second threshold, the processing logic continues monitoring the system bandwidth at block 910. When the bandwidth is less than the second threshold, the processing logic enters the IPM mode (block 914) and returns to monitor the bandwidth at block 904.

Figure 10:
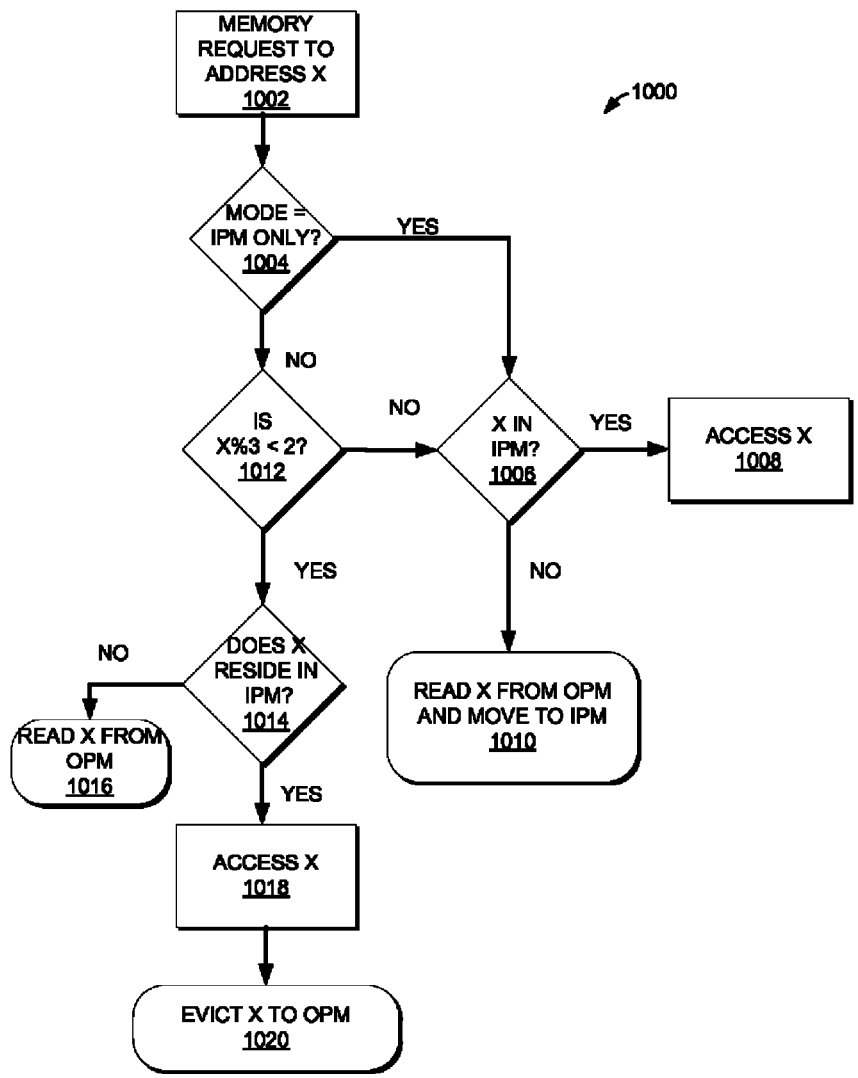
FIG. 10 is a flow diagram illustrating a method of dividing bandwidth between the near memory and far memory in view of the machine mode according to one embodiment.

FIG. 10 is a flow diagram illustrating a method 1000 of dividing bandwidth between the near memory and far memory in view of the machine mode according to one embodiment. Method 1000 may be performed by processing logic that may comprise hardware (e.g., circuitry, dedicated logic, programmable logic, microcode, etc.), software (such as instructions running on the MLMC), firmware or a combination thereof. In one embodiment, method 1000 is performed by MLMC 120 of FIG. 1. In another embodiment, the method 1000 is performed by the MLMC0 620 or MLMC1 625 of FIG. 6. Alternatively, other components of the computing system 100 or system interconnect 600 may perform some or all of the operations of the method 1000.

Referring to FIG. 10, the method 1000 begins by the processing logic receiving a memory request to address X (block 1002). The processing logic determines if the machine mode is IPM-only mode (block 1004). If in the IPM-only mode, the processing logic determines if the address X is in the IPM (block 1006). If it is, the processing logic accesses the address X in IPM (block 1008). However, if the address X is not in IPM at block 1006, the processing logic reads the address X from OPM and moves address X to IPM (block 1010). However, if at block 1004 the mode is not IPM-only mode, rather aggregate mode, the processing logic uses modulo 3 with the address X (a portion of address as described above) and determines if the result is less than two (e.g., X %3<2) (block 1012). As described above, the processing logic can use module 3 to dynamically cache 67% of the data set to IPM and 33% to OPM, so 67% of memory traffic is directed to and served by IPM. If the result is not less than two, the processing logic goes to block 1006 to determine if the address X is in IPM. However, if the result is less than two, the processing logic determines if the address X resides in IPM (block 1014). If not, the processing logic reads address X from OPM (block 1016). However, if the address X does reside in IPM at block 1014, the processing logic accesses address X in IPM (block 1018) and evicts the address X to OPM (block 1020). If the BW ratio between IPM and OPM is different, different arithmetic operation can be used like module 7, for example.

It is also possible to let software (or firmware) control the manner in which data is divided between IPM and OPM. Software or firmware might have good knowledge of the current application footprint (such as per type of 3D surfaces, the level of current game settings, or GPGPU kernels) and the available IPM and OPM capacities and BWs of each. Thus SW/FW writer can indicate the type of the memory in which the corresponding data should reside by marking some fractions of the memory pages to be left in OPM. This can be done using configuration bits the hardware can expose.

Note that the idea of dynamically separating the memory BW between the different memory agents (IPM and OPM) works orthogonally to the way IPM is managed. In other words, IPM can be managed as a cache, or as an extension to the total memory space (like in "Exclusive Memories", a.k.a. "2LM-DDR"), as described herein.

Figure 11:
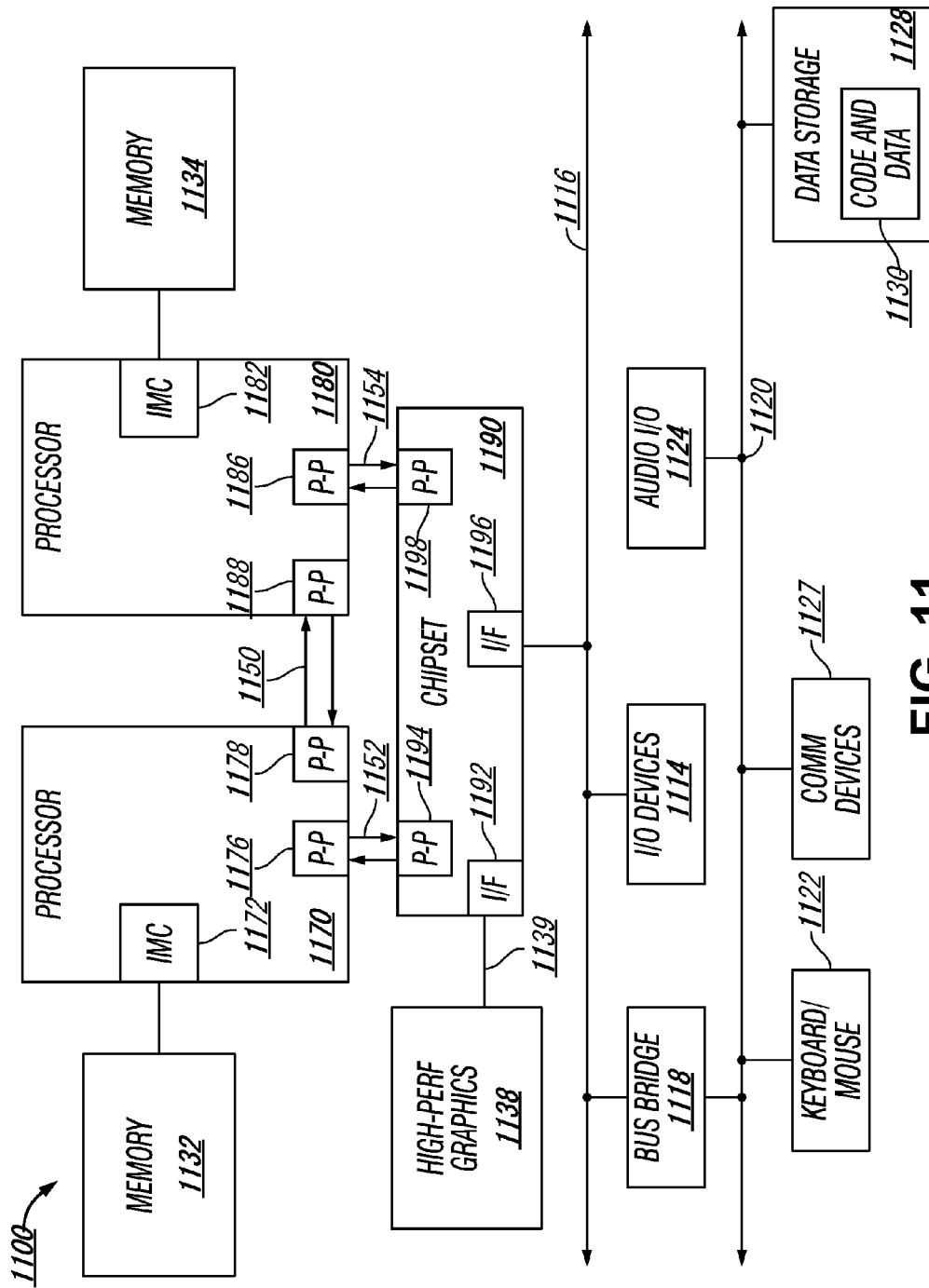
FIG. 11 is a block diagram of a computer system according to one embodiment.

Referring now to FIG. 11, shown is a block diagram of a second system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processors of the computing systems as described herein.

While shown with two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to second bus 1120. Note that other architectures are possible. For example, instead of the point-to-point architecture of FIG. 11, a system may implement a multi-drop bus or other such architecture.

Figure 12:
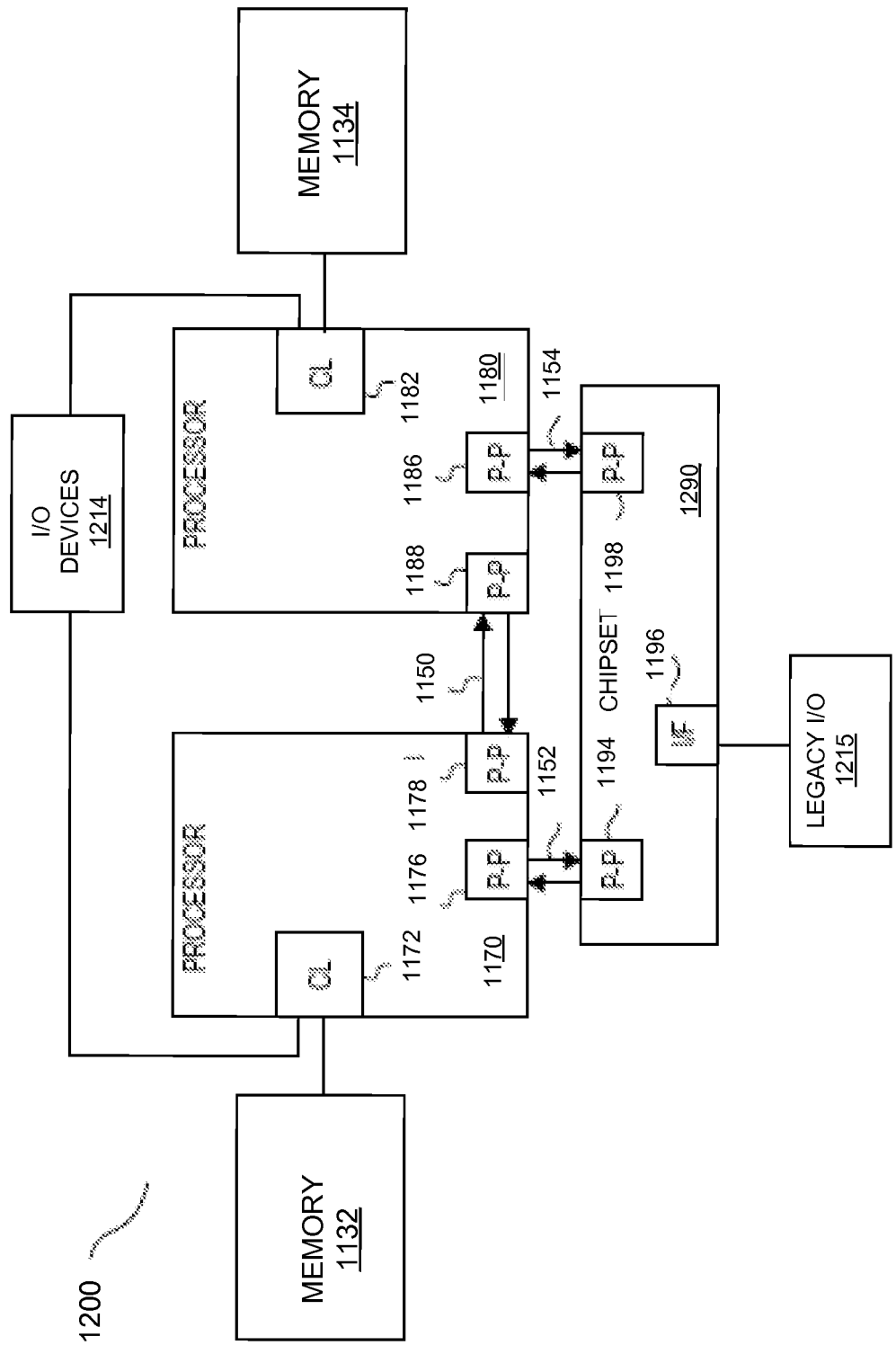
FIG. 12 is a block diagram of a computer system according to one embodiment.

Referring now to FIG. 12, shown is a block diagram of a third system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1270, 1280 may include integrated memory and I/O control logic ("CL") 1272 and 1282, respectively. For at least one embodiment, the CL 1272, 1282 may include integrated memory controller units such as described herein. In addition. CL 1272, 1282 may also include I/O control logic. FIG. 12 illustrates that the memories 1232, 1234 are coupled to the CL 1272, 1282, and that I/O devices 1214 are also coupled to the control logic 1272, 1282. Legacy I/O devices 1215 are coupled to the chipset 1290.

The following examples pertain to further embodiments.

Example 1 is a system on chip (SoC) comprising: 1) a plurality of functional units; and 2) a multi-level memory controller (MLMC) coupled to the plurality of functional units, wherein the MLMC is to be coupled to a hybrid multi-level memory architecture comprising a first-level dynamic random access memory (DRAM) that is located on-package of the SOC and a second-level DRAM that is located off-package of the SOC, wherein the MLMC is to present the first-level DRAM and the second-level DRAM as a contiguous addressable memory space to software, and wherein the first-level DRAM does not store a copy of contents of the second-level DRAM and is presented to software as additional memory capacity to a memory capacity of the second-level DRAM.

In Example 2, the first-level memory of Example 1 is a first memory type and the second-level memory is a second memory type.

In Example 3, the first-level memory of any one of Examples 1-2, is lower power per bandwidth than the second memory type.

In Example 4, the first-level memory of any one of Examples 1-3, is lower latency than the second memory type.

In Example 5, the first-level memory of any one of Examples 1-4, is higher peak bandwidth than the second memory type.

In Example 6, the MLMC of any of Examples 1-5, is to receive memory requests from the plurality of functional units; and map the memory requests to the first-level DRAM or the second-level DRAM according to a memory management scheme, wherein the memory management scheme is based on at least one of a bandwidth, a latency, a power requirement of a requesting one of the plurality of functional units.

In Example 7, the MLMC of any of Examples 1-6, is to operate as a cache controller that manages the first-level DRAM as a hardware-managed cache, and wherein the MLMC is to determine which of the first-level DRAM or the second-level DRAM the memory requests resides through a cache lookup, wherein the hardware-managed cache does not store a copy of contents of the second-level DRAM.

In Example 8, the MLMC of any of Examples 1-7, is to map a first set of memory pages accessed by one or more of the plurality of functional units in the first-level DRAM and a second set of memory pages accessed by one or more of the plurality of functional units in the second-level DRAM, wherein the first set of memory pages are accessed more frequently than the second set of memory pages.

In Example 9, the MLMC of any of Examples 1-8, is to receive a memory request from one of the plurality of functional units; identify a source identifier of the memory request; and map the memory request to the first-level DRAM or the second-level DRAM according to a memory management scheme, wherein the memory management scheme is based at least in part on the source identifier.

In Example 10, the MLMC of any of Examples 1-9, is to receive a memory request from one of the plurality of functional units, wherein the memory request corresponds to at least one of a dedicated load instruction or a dedicated store instruction that identifies one of the first-level DRAM or the second-level DRAM; and map the memory request to the first-level DRAM or the second-level DRAM according to the one of the first-level DRAM or the second-level DRAM identified in the at least one of the dedicated load instruction or the dedicated store instruction.

In Example 11, the MLMC of any of Examples 1-10, is to receive performance stall information of a previous memory request to a logical address that is mapped to a first physical address in the second-level DRAM; and re-map the logical address to a second physical address in the first-level DRAM in response to the performance stall information.

In Example 12, the subject matter of any of Examples 1-11, wherein each system-addressable memory blocks of the contiguous addressable memory space resides in only one of the first-level DRAM or the second-level DRAM at any given time.

In Example 13, the hybrid multi-level memory architecture of any of Examples 1-12, is a pointer-based, non-inclusive memory architecture.

In Example 14, the MLMC of any of Examples 1-13, is to track where a given system-addressable memory block is currently residing through a lookup table.

In Example 15, the MLMC of any of Examples 1-14, is to identify a first memory page currently residing in the second-level DRAM to be relocated to the first-level DRAM; identify a second memory page in the first-level DRAM to be swapped with the first memory page; and swap the second memory page with the first memory page.

In Example 16, the contiguous addressable memory space of any of Examples 1-15, is divided into sets and ways, wherein for each set, a first portion of the ways reside in the first-level DRAM and a second portion of the ways reside in the second-level DRAM, wherein a first number of ways in the first portion over a second number of ways in the second portion is proportional to a ratio of the additional memory capacity of the first-level DRAM to the memory capacitive of the second-level DRAM.

In Example 17, a portion of the first-level DRAM of any of Examples 1-16, is reserved for a lookup table for the MLMC, wherein the lookup table comprises N entries, where N is equal to a number of sets in the contiguous addressable memory space, wherein each of the N entries comprises a set of M pointers, where M is equal to the number of ways in the sets, and wherein the set of M pointers store way numbers of where memory blocks that map to a particular set and set-offset currently resides.

In Example 18, the subject matter of any of Examples 1-17, further comprises a second MLMC coupled to the plurality of functional units and the MLMC, wherein a bandwidth to the first-level DRAM is distributed between the MLMC and the second MLMC.

In Example 19, the plurality of functional units of any of claim 1-18, comprise a central processing unit (CPU) and a graphics processing unit (GPU).

In Example 20, the first-level memory of any of claim 1-19, is embedded DRAM (eDRAM).

In Example 21, the first-level memory of any of claim 1-20, is wide input-output (I/O) 2 (WIO2) DRAM.

In Example 22, the second-level memory of any of claim 1-21, is at least one of low-power double data rate 3 (LPDDR3) DRAM, LPDDR4 DRAM, DDR3 DRAM, DDR3L DRAM, or DDR4 DRAM.

Various embodiments may have different combinations of the structural features described above. For instance, all optional features of the SOC described above may also be implemented with respect to a processor described herein and specifics in the examples may be used anywhere in one or more embodiments.

Example 23 is a processor comprising a system interconnect for a multi-level memory (MLM) memory architecture comprising near memory that is located on-package of the processor and far memory that is located off-package of the processor, wherein the near memory is a first-level random access memory (RAM) and the far memory is a second-level RAM, wherein the system interconnect comprises: a first near-memory controller to interface to a first near-memory device of the near memory; a second near-memory controller to interface to a second near-memory device of the near memory; a first far-memory controller to interface to a first far-memory device of the far memory; a second far-memory controller to a second far-memory device of the far memory; a far-memory arbitrator (FMARB) unit; a first MLM controller (MLMC) coupled to the first near memory controller and the FMARB unit; and a second MLMC coupled to the second near memory controller and the FMARB unit.

In Example 24, the subject matter of Example 23, further comprises a plurality of functional hardware units coupled to the first MLMC and the second MLMC.

In Example 25, the subject matter of any of Examples 23-24, further comprises a system agent coupled between the plurality of functional hardware units and the first MLMC and the second MLMC.

In Example 26, the first near-memory controller of any of Examples 23-24, comprises two memory channels, wherein the second near-memory controller comprises two memory channels.

In Example 27, the first near-memory controller of any of Examples 23-25, comprises a first memory channel and the second far-memory controller comprises a second memory channel.

In Example 28, the first near-memory controller of any of Examples 23-26, comprises a first capacity that is different than a second capacity of the second memory channel.

In Example 29, a memory space of the multi-level memory (MLM) memory architecture of any of Examples 23-28, is equally distributed between the first MLMC and the second MLMC, and wherein the memory space is interleaved between the first MLMC and the second MLMC per a memory block size.

In Example 30, a total far-memory capacity of any of Examples 23-29, is equally divided to the first MLMC and the second MLMC.

In Example 31, the FMARB of any of Examples 23-30, comprises an address range-based router.

In Example 32, the FMARB of any of Examples 23-31, comprises a crossbar switch that allows each of the first MLMC and the second MLMC to send requests to each of the first far-memory controller and the second far-memory controller.

In Example 33, the plurality of functional units of any of Examples 23-32, comprise at least two of a central processing unit (CPU), a graphics processing unit (GPU), a modem, an audio digital signal processor (DSP), or a camera processing unit.

In Example 34, the near memory of any of Examples 23-33, comprises embedded dynamic random access memory (eDRAM).

In Example 35, the near memory of any of Examples 23-34, comprises wide input-output (I/O) 2 (WIO2) dynamic random access memory (DRAM).

In Example 36, the far memory of any of Examples 23-35, comprises at least one of low-power double data rate 3 (LPDDR3) DRAM, LPDDR4 DRAM, DDR3 DRAM, DDR3L DRAM, or DDR4 DRAM.

In Example 37, the first MLMC and second MLMC of any of Examples 23-36, are to map operating system (OS) visible memory to the first near-memory device, second near-memory device, first far-memory device, and second far-memory device.

Various embodiments may have different combinations of the structural features described above. For instance, all optional features of the computing system described above may also be implemented with respect to the method or process described herein and specifics in the examples may be used anywhere in one or more embodiments.

Example 38 is a method comprising: presenting to software, by a multi-level memory controller (MLMC), a contiguous addressable memory space of a hybrid multi-level memory architecture, wherein the hybrid multi-level memory architecture comprises a first-level dynamic random access memory (DRAM) that is located on-package and a second-level DRAM that is located off-package, wherein the first-level DRAM does not store a copy of contents of the second-level DRAM; receiving a memory request at the MLMC from one of a plurality of functional units; and mapping the memory request to the first-level DRAM or the second-level DRAM according to a memory management scheme.

In Example 39, the mapping of Example 28 comprises managing the first-level DRAM as a hardware-managed cache; and determining which of the first-level DRAM or the second-level DRAM the memory request resides through a cache lookup, wherein the hardware-managed cache does not store a copy of contents of the second-level DRAM.

In Example 40, the memory management scheme of any of Examples 38-39 is based on at least one of a bandwidth, a latency, a power requirement of a requesting one of the plurality of functional units.

In Example 41, the mapping of any of Examples 38-40 comprises mapping a first set of memory pages accessed by one or more of the plurality of functional units in the first-level DRAM; and mapping a second set of memory pages accessed by one or more of the plurality of functional units in the second-level DRAM, wherein the first set of memory pages are accessed more frequently than the second set of memory pages.

In Example 42, the mapping of any of Examples 38-41 comprises identifying a source identifier of the memory request; and mapping the memory request to the first-level DRAM or the second-level DRAM based at least in part on the source identifier.

In Example 43, in the subject matter of any of Examples 38-42 the memory request corresponds to at least one of a dedicated load instruction or a dedicated store instruction that identifies one of the first-level DRAM or the second-level DRAM, and wherein the mapping comprises mapping the memory request to the first-level DRAM or the second-level DRAM according to the one of the first-level DRAM or the second-level DRAM identified in the at least one of the dedicated load instruction or the dedicated store instruction.

In Example 44, the mapping of any of Examples 38-43 comprises receiving performance stall information of a previous memory request to a logical address that is mapped to a first physical address in the second-level DRAM; and re-mapping the logical address to a second physical address in the first-level DRAM in response to the performance stall information.

In Example 45, the subject matter of any of Examples 38-44 further comprises identifying a first memory page currently residing in the second-level DRAM to be relocated to the first-level DRAM; identifying a second memory page in the first-level DRAM to be swapped with the first memory page; and swapping the second memory page with the first memory page.

In Example 46, the plurality of functional units of any of Examples 38-45 comprise at least two of a central processing unit (CPU), a graphics processing unit (GPU), a modem, an audio digital signal processor (DSP), or a camera processing unit.

In Example 47, the first-level DRAM of any of Examples 38-46 is embedded dynamic random access memory (DRAM).

In Example 48, the first-level DRAM of any of Examples 38-47 is wide input-output (I/O) 2 (WIO2) dynamic random access memory (DRAM).

In Example 49, the second-level DRAM of any of Examples 38-48 is at least one of low-power double data rate 3 (LPDDR3) DRAM, LPDDR4 DRAM, DDR3 DRAM, DDR3L DRAM, or DDR4 DRAM.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 50 is a non-transitory, computer-readable storage medium including instructions that, when executed by a processor, cause the processor to perform the method of Examples 38-49.

Example 51 is a system comprising a system on chip (SOC) comprising a plurality of functional units and a system interconnect for a hybrid multi-level memory architecture, wherein the system interconnect comprises a first multi-level memory controller (MLMC) coupled to the plurality of functional units; a first-level dynamic random access memory (DRAM) located on-package of the SOC coupled to the system interconnect; and a second-level DRAM located off-package of the SOC coupled to the system interconnect, wherein the first-level DRAM does not store a copy of contents of the second-level DRAM, wherein the first MLMC is to present the first-level DRAM and the second-level DRAM as a contiguous addressable memory space to software.

In Example 52, the system interconnect of Example 51, further comprises a first near-memory controller to interface to a first near-memory device of the first-level DRAM; a second near-memory controller to interface to a second near-memory device of the first-level DRAM; a first far-memory controller to interface to a first far-memory device of the second-level DRAM; a second far-memory controller to a second far-memory device of the second-level DRAM; a far-memory arbitrator (FMARB) unit; the first MLM controller coupled to the first near memory controller and the FMARB unit; and a second MLMC coupled to the second near memory controller and the FMARB unit.

Example 53 is an apparatus comprising: a plurality of functional units; means for presenting to software a contiguous addressable memory space of a hybrid multi-level memory architecture, wherein the hybrid multi-level memory architecture comprises a first-level dynamic random access memory (DRAM) that is located on-package and a second-level DRAM that is located off-package, wherein the first-level DRAM does not store a copy of contents of the second-level DRAM; means for receiving a memory request from one of a plurality of functional units; and means for mapping the memory request to the first-level DRAM or the second-level DRAM according to a memory management scheme.

In Example 54, the first-level DRAM of Example 53 can optionally be at least one of embedded dynamic random access memory (eDRAM) or wide input-output (I/O) 2 (WIO2) DRAM, and wherein the second-level DRAM can optionally be at least one of low-power double data rate 3 (LPDDR3) DRAM, LPDDR4 DRAM, DDR3 DRAM, DDR3L DRAM, or DDR4 DRAM.

Example 55 is an apparatus comprising: a hybrid multi-level memory architecture comprising a first-level dynamic random access memory (DRAM) located on-package and a second-level DRAM that is located off-package; and a processor coupled to the hybrid multi-level memory architecture, wherein the processor comprises a plurality of functional hardware units, wherein the processor is to perform the method of any one of the Examples 38 to 49.

In Example 56, the hybrid multi-level memory architecture of Example 55 is a pointer-based, non-inclusive memory architecture. In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A system on chip (SoC) comprising:
    a plurality of functional units; and
    a multi-level memory controller (MLMC) for a hybrid multi-level memory architecture comprising a first-level dynamic random access memory (DRAM) that is located on-package of the SOC and a second-level DRAM that is located off-package of the SOC, wherein the MLMC is coupled to the plurality of functional units, wherein the MLMC is to:
        present the first-level DRAM and the second-level DRAM as a contiguous addressable memory space,
        provide the first-level DRAM to software as additional memory capacity to a memory capacity of the second-level DRAM,
        receive a memory request for an address from one of the plurality of functional units;
        determine whether a modulo 3 of the address of the memory request is less than 2;
        in response to the modulo 3 of the address of the memory request being less than 2, the MLMC is to:
            determine that the address points to a memory location in the second-level DRAM;
            read data stored at the memory location in the second-level DRAM; and
            move the data from the second-level DRAM to the first-level DRAM, wherein the first-level DRAM does not store a copy of contents of the second-level DRAM prior to the data being moved from the second-level DRAM to the first-level DRAM; and
        in response to the modulo 3 of the address of the memory request being equal to or greater than 2, the MLMC read data stored at the memory location in the first-level DRAM.

2. The SOC of claim 1, wherein the first-level DRAM is a first memory type and the second-level DRAM is a second memory type.

3. The SOC of claim 2, wherein the first memory type is at least one of lower power per bandwidth than the second memory type, lower latency than the second memory type, or higher peak bandwidth than the second memory type.

4. The SOC of claim 1, wherein the MLMC is to:
    receive memory requests from the plurality of functional units; and
    map the memory requests to the first-level DRAM or the second-level DRAM according to a memory management scheme, wherein the memory management scheme is based on at least one of a bandwidth, a latency, a power requirement of a requesting one of the plurality of functional units.

5. The SOC of claim 1, wherein the MLMC is to operate as a cache controller that manages the first-level DRAM as a hardware-managed cache, and wherein the MLMC is to determine which of the first-level DRAM or the second-level DRAM memory requests resides through a cache lookup, wherein the hardware-managed cache does not store the copy of contents of the second-level DRAM.

6. The SOC of claim 1, wherein the MLMC is to map a first set of memory pages accessed by one or more of the plurality of functional units in the first-level DRAM and a second set of memory pages accessed by one or more of the plurality of functional units in the second-level DRAM, wherein the first set of memory pages are accessed more frequently than the second set of memory pages.

7. The SOC of claim 1, wherein the MLMC is further to:
    identify a source identifier of the memory request; and
    map the memory request to the first-level DRAM or the second-level DRAM according to a memory management scheme, wherein the memory management scheme is based at least in part on the source identifier.

8. The SOC of claim 1, wherein:
    the memory request corresponds to at least one of a dedicated load instruction or a dedicated store instruction that identifies one of the first-level DRAM or the second-level DRAM; and
    the MLMC is further to map the memory request to the first-level DRAM or the second-level DRAM according to the one of the first-level DRAM or the second-level DRAM identified in the at least one of the dedicated load instruction or the dedicated store instruction.

9. The SOC of claim 1, wherein the MLMC is further to:
    receive performance stall information of a previous memory request to a logical address that is mapped to a first physical address in the second-level DRAM; and
    re-map the logical address to a second physical address in the first-level DRAM in response to the performance stall information.

10. The SOC of claim 1, wherein each system-addressable memory blocks of the contiguous addressable memory space resides in only one of the first-level DRAM or the second-level DRAM at any given time.

11. The SOC of claim 1, wherein the hybrid multi-level memory architecture is a pointer-based, non-inclusive memory architecture.

12. The SOC of claim 1, wherein the MLMC is further to:
    identify a first memory page currently residing in the second-level DRAM to be relocated to the first-level DRAM;
    identify a second memory page in the first-level DRAM to be swapped with the first memory page; and
    swap the second memory page with the first memory page.

13. The SOC of claim 1, wherein the contiguous addressable memory space is divided into sets and ways, wherein for each set, a first portion of the ways reside in the first-level DRAM and a second portion of the ways reside in the second-level DRAM, wherein a first number of ways in the first portion over a second number of ways in the second portion is proportional to a ratio of the additional memory capacity of the first-level DRAM to the memory capacitive of the second-level DRAM.

14. The SOC of claim 1, wherein the first-level DRAM is embedded DRAM (eDRAM).

15. The SOC of claim 1, wherein the first-level DRAM is wide input-output (I/O) 2 (WIO2) DRAM.

16. The SOC of claim 1, wherein the second-level DRAM is at least one of low-power double data rate 3 (LPDDR3) DRAM, LPDDR4 DRAM, DDR3 DRAM, DDR3L DRAM, or DDR4 DRAM.

17. A processor comprising:
a system interconnect, for a multi-level memory (MLM) architecture, comprising:
near memory that is located on-package of the processor;
far memory that is located off-package of the processor, wherein the near memory is a first-level dynamic random access memory (DRAM) and the far memory is a second-level (DRAM);
a plurality of functional units coupled to a first multi-level memory controller (MLMC) and a second MLMC;
a first near-memory controller to interface to a first near-memory device of the near memory;
a second near-memory controller to interface to a second near-memory device of the near memory;
a first far-memory controller to interface to a first far-memory device of the far memory;
a second far-memory controller to interface to a second far-memory device of the far memory;
a far-memory arbitrator (FMARB) unit coupled to the first far-memory controller and the second far-memory controller;
the first MLMC coupled to the first near memory controller and the FMARB unit, the first MLMC to:
receive a memory request for an address from one of the plurality of functional units;
switch to an aggregate mode when a system bandwidth exceeds a bandwidth threshold, wherein the first MLMC monitors the system bandwidth in the aggregate mode to determine when the bandwidth exceeds a second threshold;
in response to the system bandwidth exceeding the bandwidth threshold, determine that the address points to a memory location in a second-level DRAM when a modulo 3 of the address of the memory request is less than 2;
read data stored at the memory location in the second-level DRAM; and
move the data from the second-level DRAM to the first-level DRAM; and
a second MLMC coupled to the second near memory controller and the FMARB unit.

18. The processor of claim 17, further comprising a system agent coupled between the plurality of functional units and the first MLMC and the second MLMC.

19. The processor of claim 17, wherein the first near-memory controller comprises two memory channels, wherein the second near-memory controller comprises two memory channels, wherein the first far-memory controller comprises a first memory channel and the second far-memory controller comprises a second memory channel.

20. The processor of claim 19, wherein the first memory channel comprises a first capacity that is different than a second capacity of the second memory channel.

21. The processor of claim 17, wherein a memory space of the multi-level memory (MLM) memory architecture is equally distributed between the first MLMC and the second MLMC, wherein the memory space is interleaved between the first MLMC and the second MLMC per a memory block size, and wherein a total far-memory capacity is equally divided to the first MLMC and the second MLMC.

22. The processor of claim 17, wherein the first MLMC is further to switch to an in-package memory (IPM) mode when the system bandwidth is below the second threshold.

23. A method comprising:
presenting to software, by a multi-level memory controller (MLMC), a contiguous addressable memory space of a hybrid multi-level memory architecture, wherein the hybrid multi-level memory architecture comprises a first-level dynamic random access memory (DRAM) that is located on-package and a second-level DRAM that is located off-package, wherein the first-level DRAM does not store a copy of contents of the second-level DRAM;
receiving, at the MLMC, a memory request for an address in the contiguous addressable memory space from one of a plurality of functional units;
determining that the MLMC is in an aggregate mode when a system bandwidth exceeds a bandwidth threshold, wherein the MLMC monitors the system bandwidth in the aggregate mode to determine when the system bandwidth exceeds a second threshold;
in response to the system bandwidth exceeding the bandwidth threshold, determining that the address points to a memory location in the second-level DRAM when a modulo 3 of the address of the memory request is less than 2;
reading data stored at the memory location in the second-level DRAM; and
moving the data from the second-level DRAM to the first-level DRAM.

24. The method of claim 23, further comprising mapping the memory request to the first-level DRAM or the second-level DRAM according to a memory management scheme, wherein the memory management scheme is based on at least one of a bandwidth, a latency, a power requirement of a requesting one of the plurality of functional units.

25. The method of claim 24, wherein the mapping comprises:
mapping a first set of memory pages accessed by one or more of the plurality of functional units in the first-level DRAM; and
mapping a second set of memory pages accessed by one or more of the plurality of functional units in the second-level DRAM, wherein the first set of memory pages are accessed more frequently than the second set of memory pages.

26. The method of claim 23, further comprising:
identifying a first memory page currently residing in the second-level DRAM to be relocated to the first-level DRAM;
identifying a second memory page in the first-level DRAM to be swapped with the first memory page; and
swapping the second memory page with the first memory page.

27. The method of claim 23, further comprising switching the MLMC to an in-package memory (IPM) mode when the system bandwidth is below the second threshold.

* * * * *